(12) United States Patent
Castellanos Zamora et al.

(10) Patent No.: US 12,075,345 B2
(45) Date of Patent: Aug. 27, 2024

(54) REGISTERING AND REQUESTING SERVICES IN A SERVICE BASED ARCHITECTURE

(71) Applicant: Telefonaktiebolaget LM Ericsson (publ), Stockholm (SE)

(72) Inventors: David Castellanos Zamora, Madrid (ES); Emiliano Merino Vazquez, Madrid (ES); Cristina Ruiz Balmaseda, Madrid (ES); Jesus Angel De Gregorio Rodriguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/626,550

(22) PCT Filed: Jun. 12, 2020

(86) PCT No.: PCT/EP2020/066347
§ 371 (c)(1),
(2) Date: Jan. 12, 2022

(87) PCT Pub. No.: WO2021/018460
PCT Pub. Date: Feb. 4, 2021

(65) Prior Publication Data
US 2022/0248316 A1    Aug. 4, 2022

(30) Foreign Application Priority Data

Jul. 26, 2019 (EP) .................................. 19382645

(51) Int. Cl.
*H04W 48/18* (2009.01)
*H04W 12/08* (2021.01)
(Continued)

(52) U.S. Cl.
CPC ........... *H04W 48/18* (2013.01); *H04W 12/08* (2013.01); *H04W 60/00* (2013.01); *H04W 76/10* (2018.02)

(58) Field of Classification Search
None
See application file for complete search history.

(56) References Cited

U.S. PATENT DOCUMENTS

| 2019/0182875 | A1* | 6/2019 | Talebi Fard | ......... H04W 76/11 |
| 2022/0150810 | A1* | 5/2022 | Wang | ..................... H04W 40/24 |
| 2022/0248225 | A1* | 8/2022 | Bykampadi | ........... H04W 12/08 |

FOREIGN PATENT DOCUMENTS

| CN | 108632216 A | 10/2018 |
| CN | 109688586 B | 12/2021 |
| WO | 2019076801 A1 | 4/2019 |

OTHER PUBLICATIONS

"3GPP TS 29.328 V15.6.0", 3rd Generation Partnership Project; Technical Specification Group Core Network and Terminals; IP Multimedia (IM) Subsystem Sh interface; Signalling flows and message contents (Release 15), Mar. 2019, pp. 1-79.
(Continued)

*Primary Examiner* — Hong Shao
(74) *Attorney, Agent, or Firm* — Murphy, Bilak & Homiller, PLLC

(57) ABSTRACT

Embodiments described herein relate to methods and apparatuses for registering one or more services that a producer network function is capable of providing at a network repository function and allowing for the access of those services by consumer network functions. A method in a producer network function comprises transmitting a registration request to the NRF, wherein the registration request comprises registration information comprising: an indication of the one or more services; and an indication of resources and operations associated with each resource of
(Continued)

the one or more services that are allowed per network function consumer type.

34 Claims, 19 Drawing Sheets

(51) Int. Cl.
*H04W 60/00* (2009.01)
*H04W 76/10* (2018.01)

(56) References Cited

OTHER PUBLICATIONS

"3GPP TS 23.502 V16.6.0", 3rd Generation Partnership Project; Technical Specification Group Services and System Aspects; Procedures for the 5G System (5GS); Stage 2 (Release 16), Sep. 2020, pp. 1-597.

"3GPP TS 23.502 V16.1.1", 3rd Generation Partnership Project; Technical Specification Group Services and System Aspects; Procedures for the 5G System; Stage 2 (Release 16), Jun. 2019, pp. 1-495.

"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

Hardt, D., "The OAuth 2.0 Authorization Framework", RFC 6749, Internet Engineering Task Force, IEFT; Standard Internet Society (ISOC) 4, Oct. 13, 2012, pp. 1-76.

"3GPP TS 33.501 V15.4.0", 3rd Generation Partnership Project; Technical Specification Group Services and System Aspects; Security architecture and procedures for 5G system (Release 15), Mar. 2019, pp. 1-187.

"3GPP TS 23.501 V16.3.0", 3rd Generation Partnership Project; Technical Specification Group Services and System Aspects; System architecture for the 5G System (5GS); Stage 2 (Release 16), Dec. 2019, pp. 1-417.

* cited by examiner

REGISTERING AND REQUESTING SERVICES IN A SERVICE BASED ARCHITECTURE

TECHNICAL FIELD

Embodiments described herein relate to methods and apparatus for registering one or more services that a producer network function is capable of providing at a network repository function and allowing for the access of those services by consumer network functions. In some examples, the registration information may comprise an indication of resources and operations associated with each resource of the one or more services that are allowed per network function consumer type.

BACKGROUND

3GPP is currently standardizing the 5G Core Network as part of the overall 5G System architecture. The 5G Core Network is composed of a set of relevant functional entities, called Network Functions (NFs). 5G System Architecture may be defined as a Service Based Architecture (SBA) for the control plane, i.e. a system architecture in which the system functionality is achieved by a set of NFs providing services to other authorized NFs to access their services. Control Plane (CP) Network Functions in the 5G System architecture are based on SBA.

A NF service is one type of capability which may be exposed by an NF (NF Service Producer) to another authorized NF (NF Service Consumer) through a service-based interface (SBI). A NF service may support one or more NF service operation(s).

A service-based interface represents how the set of services is provided or exposed by a given NF. This is the interface where the NF service operations are invoked, and it is currently based on HTTP/2 protocol.

FIG. 1 illustrates a 5G System reference architecture showing service-based interfaces used within the Control Plane. It will be appreciated that not all NFs are depicted.

The Network Repository Function (NRF) is a key NF within the 5GC SBA Framework that provides registration and discovery capabilities among the different NFs within the 5GC. In short, when a given NF (e.g. UDM type) registers a NF profile in the NRF, other NFs may discover it automatically by simply querying NRF to find NFs of a given type (e.g. UDM type).

The NRF also acts as an authorization server within, for example, an Oauth framework, so that a consumer NF wishing to request authorization to consume (or access) a service from a producer NF, may requests an access token from NRF.

FIG. 2 illustrates a method for requesting an access token.

In step 201, the consumer NF registers with the NRF.

In step 202, the consumer NF transmits an access token request to the NRF. The access token request may comprise an indication of one or more expected services (Expected NF Service Name(s)). The access token request also comprises an indication of the NF type expected for the producer NF of the expected services. The access token request further comprises an indication of the consumer NF type and an identification of the client.

In step 203, the NRF may then generate an access token. The access token may comprise an indication of the scope of authorization of the token. This scope may include the service(s) authorized by the producer NF to the consumer NF, e.g. if NRF authorizes Subscriber Data Management Service (SDM service) and User Equipment Context Management service (UECM service), it will indicate so in the access token generated.

In step 204 the NRF transmits the access token to the consumer NF.

FIG. 3 illustrates an example of a consumer NF accessing a service using an access token.

In step 301, the consumer NF transmits a service request to the producer NF including the access token. The request and access token are verified by the producer NF, in step 302, and if the access token allows the use of the specific service requested (e.g. SDM), the service request will be accepted and in step 303 the producer NF may transmit a response to the consumer NF.

SUMMARY

According to some embodiments there is provided a method in a producer network function for registering one or more services that the producer network function is capable of providing at a network repository function, NRF. The method comprises transmitting a registration request to the NRF, wherein the registration request comprises registration information comprising: an indication of the one or more services; and an indication of resources and operations associated with each resource of the one or more services that are allowed per network function consumer type.

According to some embodiments there is provided a method in a consumer network function for requesting a service from a producer network function. The method comprising: transmitting a registration request to a network repository function, NRF, wherein the registration request comprises: an indication of one or more services that are expected to be consumed; an indication of resources and operations associated with each resource of the one or more services that are expected to be consumed; and an indication of the consumer network function type.

According to some embodiments there is provided a method in a network repository function for authorising a consumer network function to access services at a producer network function. The method comprises receiving a registration request from a producer network function, wherein the registration request comprises registration information comprising: an indication of one or more services; and an indication of resources and operations associated with each resource of the one or more services that are allowed per network function consumer type; and storing the registration information associated with an identity of the producer network function; receiving a registration request from a consumer network function, wherein the registration request comprises registration information comprising: an indication of one or more services that are expected to be consumed; and an indication of resources and operations associated with each resource of the one or more services that are expected to be consumed; and an indication of the consumer network function type; and storing the registration information associated with an identity of the consumer network function.

According to some embodiments there is provided a producer network function for registering one or more services that the producer network function is capable of providing at a network repository function, NRF. The producer network function comprises processing circuitry configured to: transmit a registration request to the NRF, wherein the registration request comprises registration information comprising: an indication of the one or more services; and an indication of resources and operations associated with each resource of the one or more services that are allowed per network function consumer type.

According to some embodiments there is provided a consumer network function for requesting a service from a producer network function. The consumer network function comprises processing circuitry configured to: transmit a registration request to a network repository function, NRF, wherein the registration request comprises: an indication of one or more services that are expected to be consumed; an indication of resources and operations associated with each resource of the one or more services that are expected to be consumed; and an indication of the consumer network function type According to some embodiments there is provided a network repository function for authorising a consumer network function to access services at a producer network function. The network repository function comprises processing circuitry configured to: receive a registration request from a producer network function, wherein the registration request comprises registration information comprising: an indication of one or more services; and an indication of resources and operations associated with each resource of the one or more services that are allowed per network function consumer type; and store the registration information associated with an identity of the producer network function; receive a registration request from a consumer network function, wherein the registration request comprises registration information comprising: an indication of one or more services that are expected to be consumed; and an indication of resources and operations associated with each resource of the one or more services that are expected to be consumed; and an indication of the consumer network function type; and store the registration information associated with an identity of the consumer network function.

According to some embodiments there is provided a method in a consumer network function for requesting a service from a producer network function. The method comprises: transmitting an access token request to a network repository function, NRF, wherein the access token request comprises an indication of one or more expected services; receiving an access token from the NRF, wherein the access token comprises an indication of authorised resources and operations associated with each resource of the one or more expected services; and transmitting a service request to a producer network function, wherein the service request comprises: the access token; and requested operation over a requested resource.

According to some embodiments there is provided a consumer network function for requesting a service from a producer network function. The consumer network function comprising processing circuitry configured to: transmit an access token request to a network repository function, NRF, wherein the access token request comprises an indication of one or more expected services; receive an access token from the NRF, wherein the access token comprises an indication of authorised resources and operations associated with each resource of the one or more expected services; and transmit a service request to a producer network function, wherein the service request comprises: the access token; and a requested operation over a requested resource.

According to some embodiments there is provided a method in a network repository function for authorising a consumer network function to access services at a producer network function. The method comprising: receiving a registration request from a producer network function, wherein the registration request comprises registration information comprising: an indication of one or more services; and an indication of resources and operations associated with each resource of the one or more services that are allowed per network function consumer type; and storing the registration information associated with an identity of the producer network function.

According to some embodiments there is provided a network repository function for authorising a consumer network function to access services at a producer network function. The network repository function comprises processing circuitry configured to: receive a registration request from a producer network function, wherein the registration request comprises registration information comprising: an indication of one or more services; and an indication of resources and operations associated with each resource of the one or more services that are allowed per network function consumer type; and store the registration information associated with an identity of the producer network function.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Figure 1:
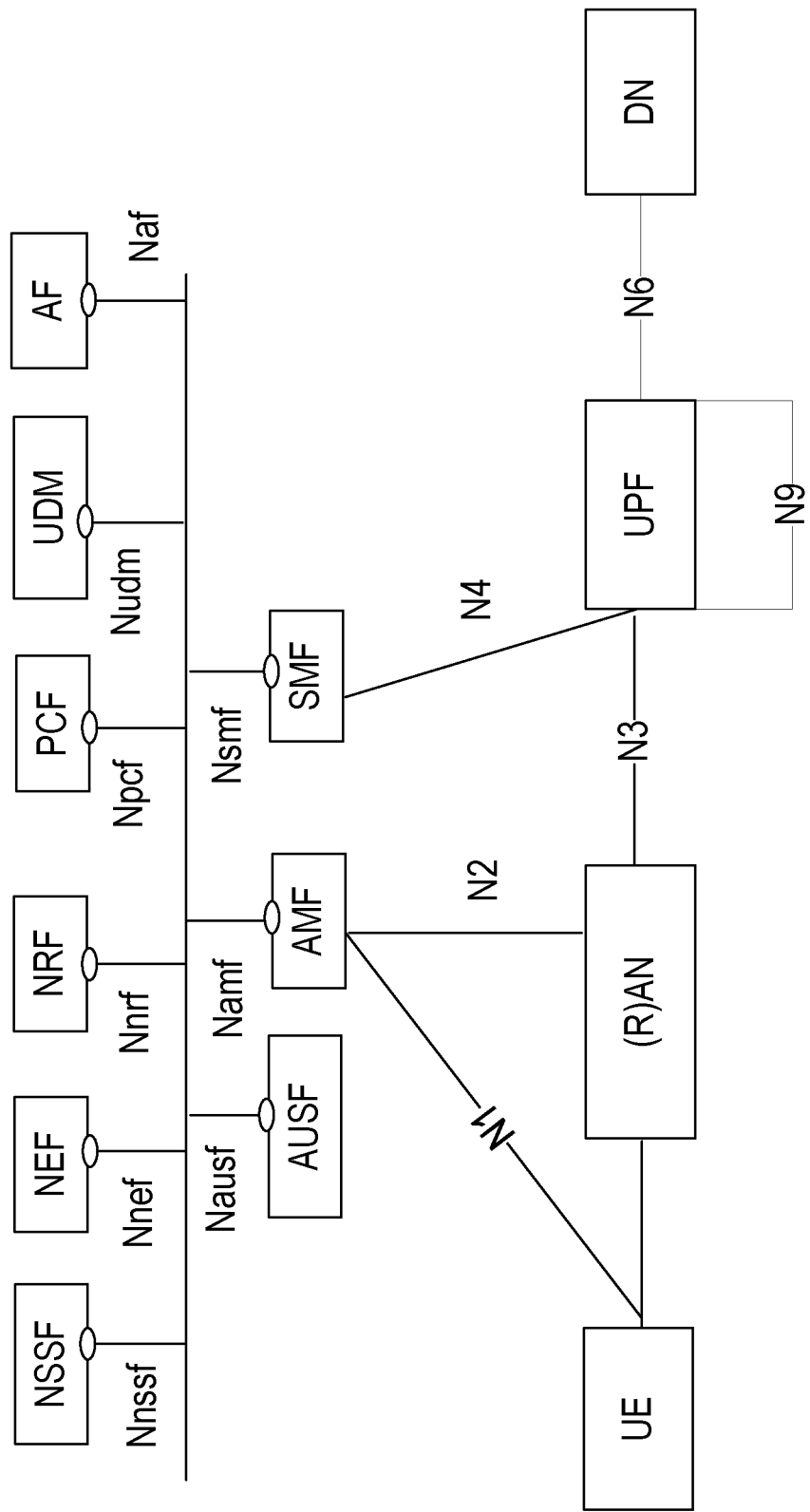
FIG. 1 illustrates a 5G System reference architecture showing service-based interfaces used within the Control Plane.
Figure 2:
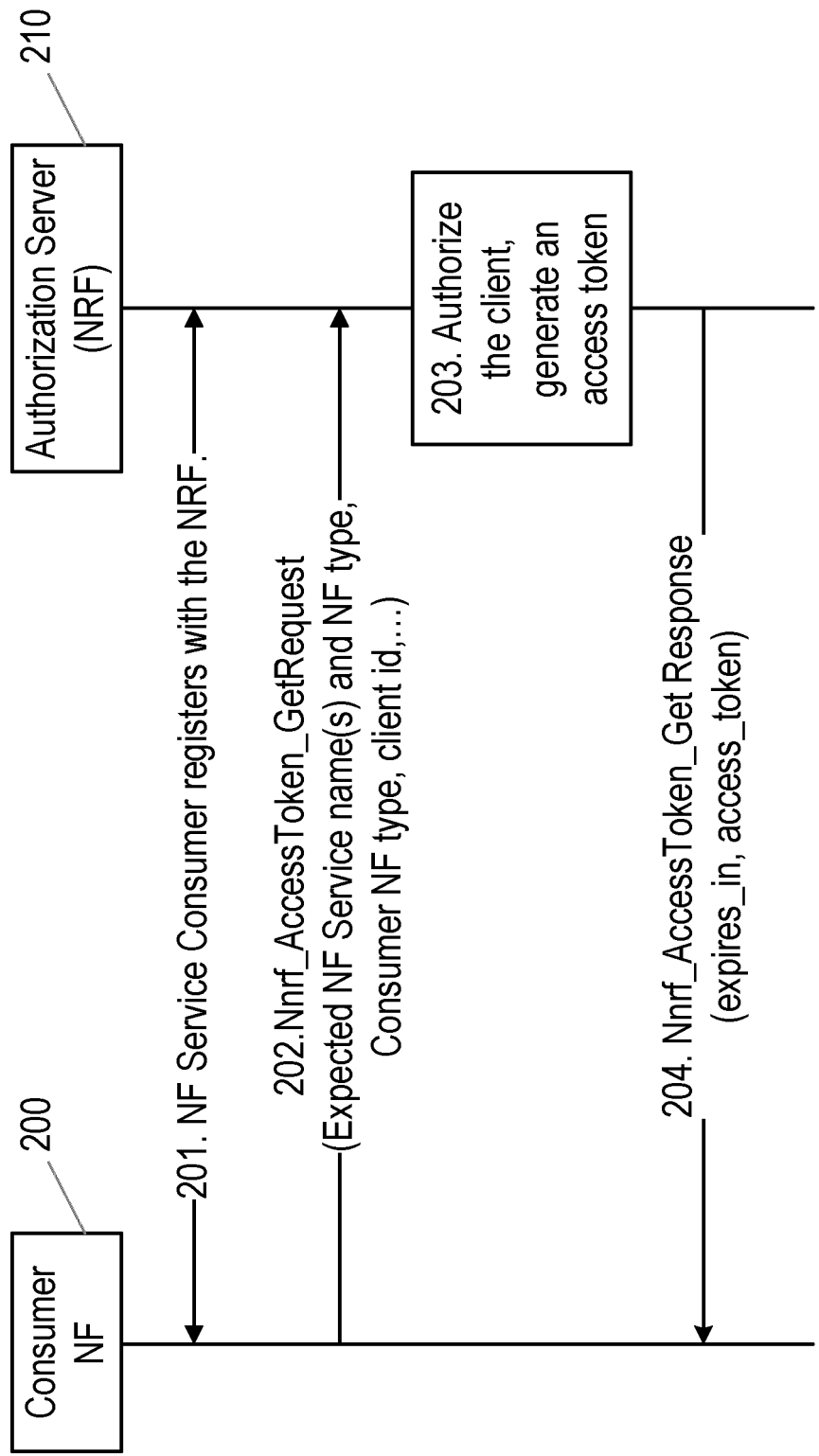
FIG. 2 illustrates a method for requesting an access token.
Figure 3:
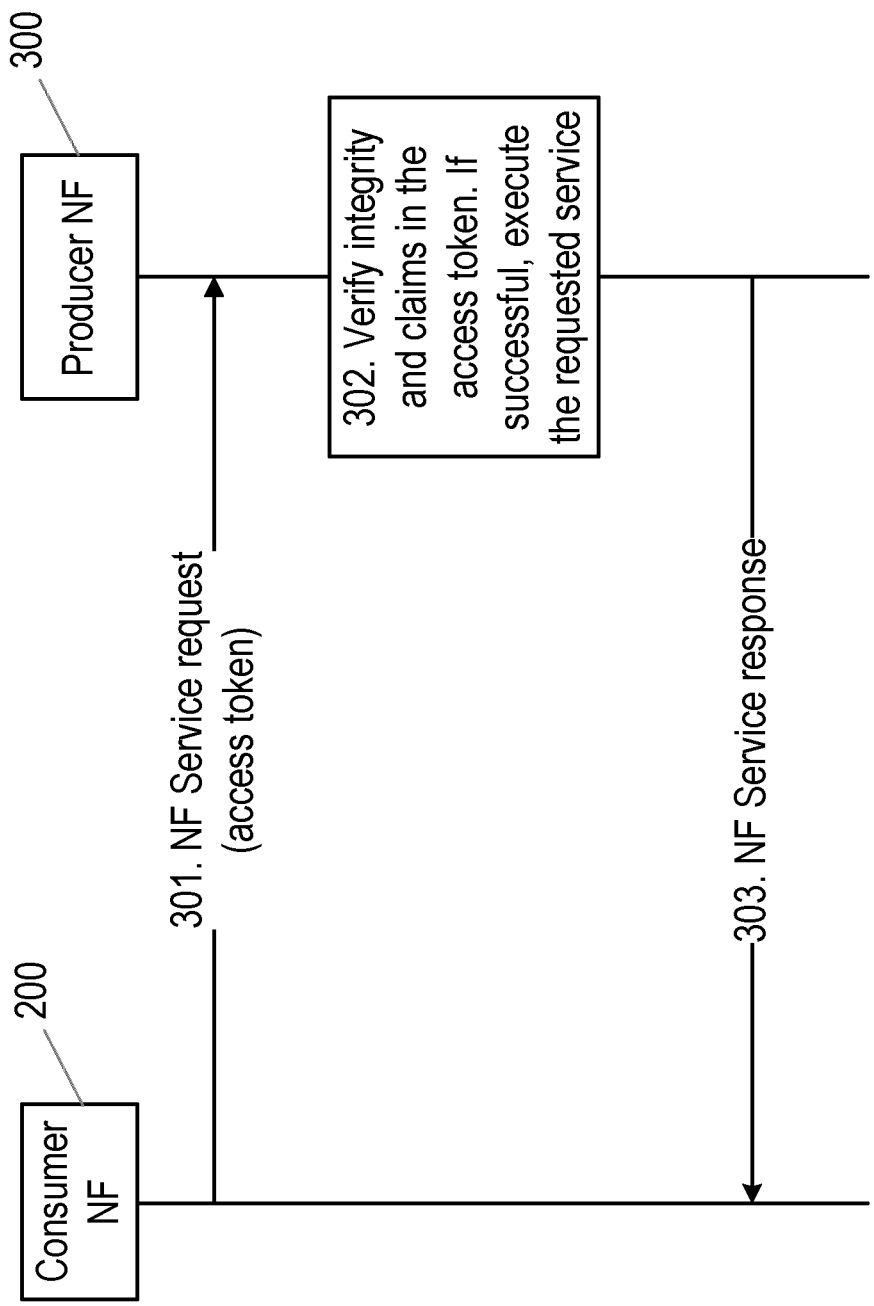
FIG. 3 illustrates an example of a consumer NF accessing a service using an access token.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

The 3GPP usage of Oauth scope only allows for authorization of specific services (e.g. SDM), which includes authorization to use all resources owned by the service (Access and Mobility data, Session Management data, etc.). There is no possibility for authorizing only part of those resources which a particular service can provide (for example only authorizing for the use of Access and Mobility data and not Session Management data). Moreover, operations for those resources cannot be authorized at present.

For example, an SDM service may allow for the use of several resources (e.g. am-data, trace-data, smf-selection-data, sm-data etc.), but it may be desirable for not all the resources to be granted to all NFs for whom the service is authorized.

For example, a Unified Data Management (UDM) NF might be required to grant the access to the Access and Mobility data (am-data) of a user (e.g. Maximum Bit-Rate) only to certain NFs (e.g. AMF).

The consumer NFs may be granted the use of the SDM service (with all associated resources), but it may be desirable for access to the types of SDM data to be more granular (for example, the access may be provided per resource, such as MSISDN and operation (read/write)). In other words, the Oauth scope of the authorization in 5GC is per service, not per resource/data type within the service and operation(s) per resource/data type.

Furthermore, 3GPP TS 23.502 includes a requirement for the UDM to authorize whether UDM consumer are authorized to retrieve specific subscription data types over e.g. Nudm_SDM_Get operation, see below:

"5.2.3.3.2 Nudm_SDM_Get service operation

Service Operation name: Nudm_SDM_Get

Description: Consumer NF gets the subscriber data indicated by the subscription data type input from UDM. The UDM shall check the requested consumer is authorized to get the specific subscription data requested. In case of NF consumer is SMF, the subscriber data may contain e.g. Allowed PDU Session Type(s), Allowed SSC mode(s), default 5QI/ARP, Subscribed S-NSSAI (s).

Inputs, Required: NF ID, Subscription data type(s), Key for each Subscription data type(s).

Inputs, Optional: Data Sub Key(s).

Outputs, Required: The consumer NF gets the requested subscription data.

Outputs, Optional: None."

There is however no mechanism defined for the UDM to perform such authorization at SDM resource level.

One option may be to transmit an access token request with the list of resources and operations that are requested to be authorised. But this is not a future-proof solution as the list of resources may be extensive, and, in the future may continue to grow. For the same reasons, the list of resources and operations may be dynamic, and this could result in all NFs requesting a new list every time it is updated According to embodiments described herein, when the service consumer NF (e.g. an AMF) registers in NRF (e.g. at NF startup), as part of the registration information (e.g. in an NF profile), it may include an indication of the consumer NF subtype or category (e.g. AMF subtype or AMF category) for each service(s) that the consumer NF intends to use/consume (e.g. nudm-sdm).

An additional scope information may be configured in the NF consumer as part of the operator's network configuration, and may only be configured if the operator requires different or additional treatment (e.g. for resources authorization) of one subtype of NF compared to other NFs of the same type (e.g. NF type=AMF, NF subtype=X).

It will be appreciated that the NRF cannot in any case base on the NF id when it comes to local preconfiguration, since in cloud native deployments, this NF Id might not be permanent, but auto-generated every time the NF starts up.

In some embodiments, when the producer NF (e.g. an UDM) registers in the NRF (e.g. at NF startup), as part of the registration information (for example in an NF profile), the producer NF may include an indication of resources and operations associated with each resource of one or more services that are allowed per network function consumer type (and optionally subtype). This additional scope information may be configured in the producer NF as part of the operator's network configuration.

In some embodiments, when the consumer NF requests an access token, the NRF verifies the request and generates an access token. The access token request comprises: 1) the NF type of the NF consumer (e.g. AMF); 2) an indication of the services expected to access (e.g. nudm-sdm); 3) optionally an indication of the subtype of the consumer NF; and 4) the target NF type (e.g. UDM), also known in Oauth as the "audience".

The NRF checks if there is any indication of the subtype in the access token request. If there is no additional scope information in the access token request, the NRF may generate an access token with a preconfigured allowed resources and operations associated with each resource of the expected services for the NF type received, e.g. if the NF type is AMF (Access and Mobility Management Function), the preconfigured allowed resources could be am-data (access and mobility data). Hence, the generated access token may comprise an indication of authorised resources and operations associated with each resource of the one or more expected services. The access token may only be generated if there is a proper audience i.e. if there is at least one instance of target NF type (e.g. one instance of UDM NF type) which has previously registered appropriate allowed operations and resources for the consumer NF type.

Otherwise, if an indication of a subtype is present in the access token request, the NRF, prior to the access token generation, may check that there is a suitable audience, i.e. there is at least one NF instance of target NF type (e.g. UDM) which has registered that the expected service would be allowed for the subtype present in the access token request. In this example, the NF Subtype=X identified in the producer NF (e.g. UDM) is allowed use of a set of preconfigured resources/data in the producer NF and its allowed operations (read, write). The generated access token may then include the preconfigured resources and operations for the expected services.

In some embodiments, when the NF service consumer intends to request a service from the NF service producer, it may first discover (i.e. queries NRF) which NF instance produces the requested service for a give NF type (e.g. UDM) and also supports the authorized resources and operations indicated in the access token. In this discovery, NRF may return the set of NFs of the NF type (e.g. UDM) which had previously registered the support of authorizing the authorized resources and operations for the consumer NF type and optionally NF subtype.

In some embodiments, the NF service producer may verify the access token and make use of the indication of the authorized resources and operations in the access token to authorize that the service request and the resources being requested can be accessed by the requesting consumer NF.

Figure 4:
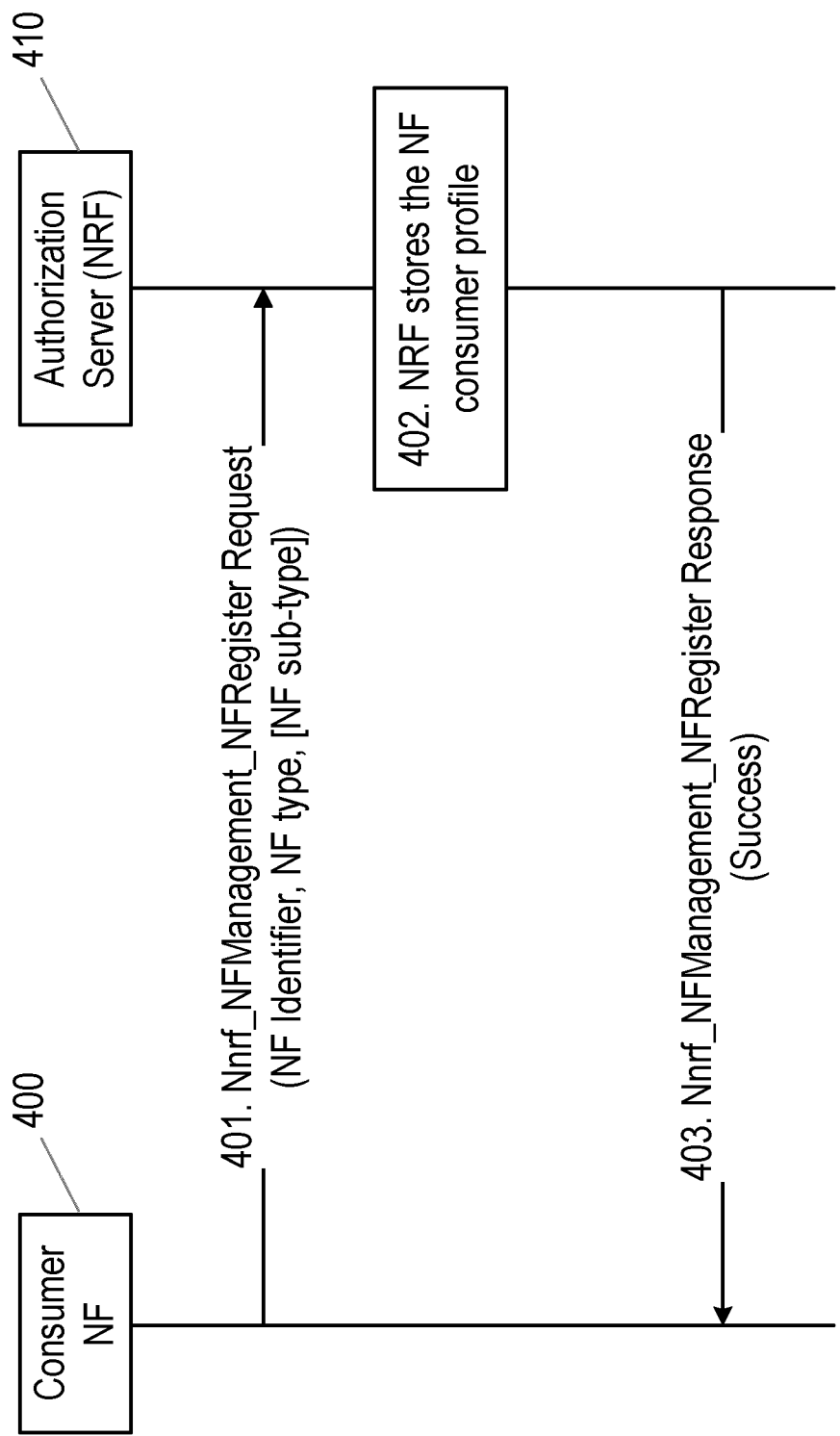
FIG. 4 illustrates an example signalling diagram for a consumer NF registering with an authorisation server.
Figure 5:
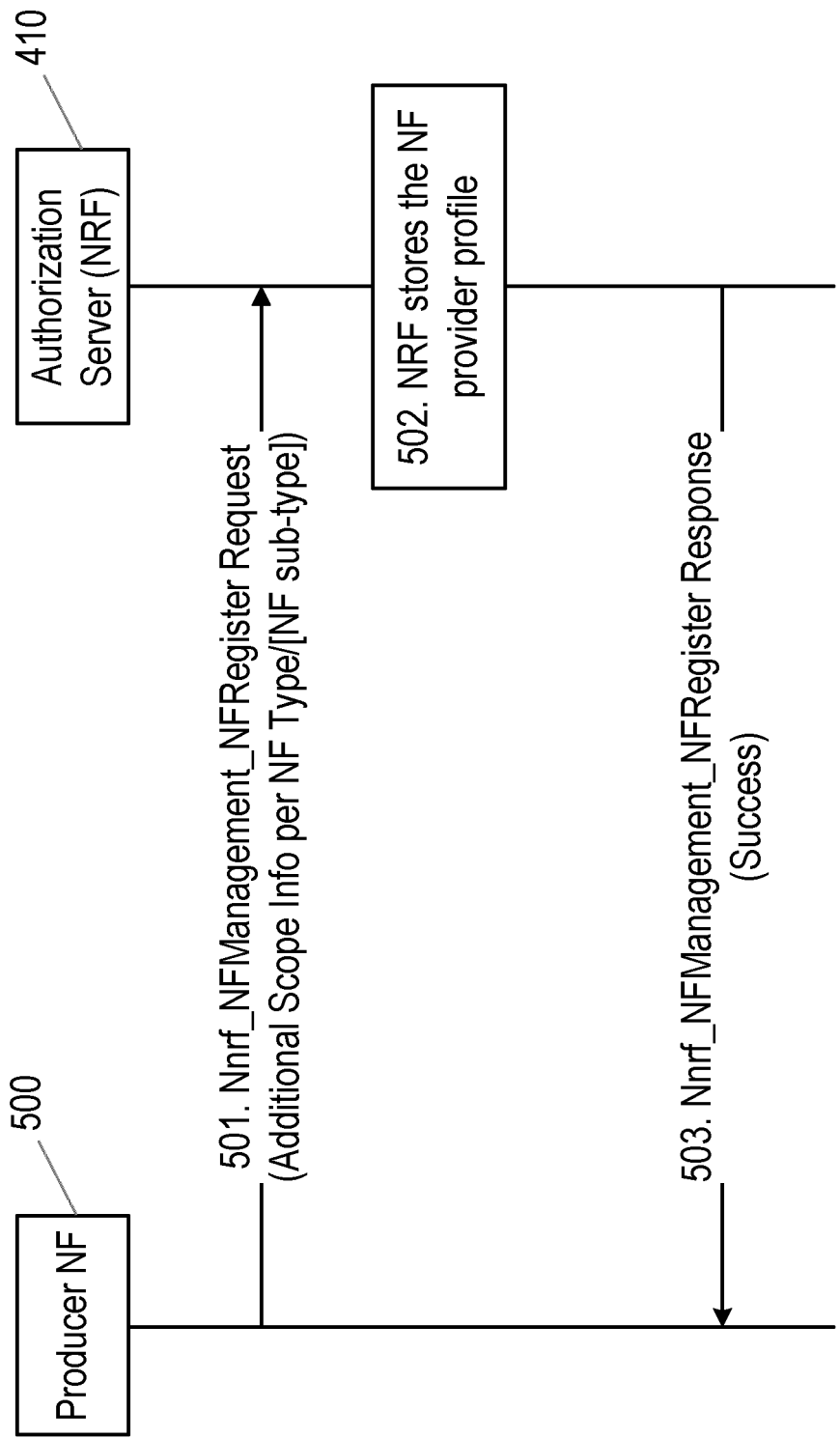
FIG. 5 is an example signalling diagram illustrating a producer NF registering one or more services that the producer NF is capable of providing as registered at a network repository function (NRF)

It will be appreciated that, in order for an NF in a system to be discoverable via the NRF, the NF may first register at the NRF. FIGS. 4 and 5 illustrate registration processes with the NRF.

FIG. 4 illustrates an example signalling diagram for a consumer NF registering with an authorisation server (in this example an NRF).

In step 401, the consumer NF 400 transmits a registration request to a network repository function, NRF 410. The registration request comprises registration information. The registration information comprises an indication of the consumer network function type (NF type). The registration information may also comprise an identification of the consumer NF (NF Identifier). The registration information may also comprise an indication of the consumer network function subtype (NF sub-type). For example, an NF may be of a UDM type and a UDM-ARPF sub-type.

In some examples, the registration information also comprises an indication of one or more services that are expected to be consumed by the consumer NF 400; and an indication of resources and operations associated with each resource of the one or more services that are expected to be consumed. This may be included in the registration information in circumstances. Including the one or more services that are expected to be consumed by the consumer in the registration information allows the NRF to revoke authorization to a service consumer NF if a given scope of authorization is not existing any more in the network.

In step 402, the NRF 410 stores the registration information associated with an identity of the consumer NF 400.

In step 403, the NRF 410 may indicate to the consumer NF 400 that the registration has been made.

FIG. 5 is an example signalling diagram illustrating a producer NF 500 registering one or more services that the producer NF 500 is capable of providing as registered at a network repository function.

In step 501, the producer NF 500 transmits a registration request to the NRF 410, wherein the registration request comprises registration information comprising: an indication of the one or more services; and an indication of resources and operations associated with each resource of the one or more services that are allowed per network function consumer type (Additional Scope Info per NF Type).

In some examples, the indication of resources and operations associated with each resource of the one or more services that are allowed is registered per network function consumer type and subtype (NF sub-type). The consumer subtype may only be transmitted in circumstances where they may be a need to differentiate amongst different NFs of the same type for determining access authorisation for each resource and operation.

The registration information may further comprise one or more of: an indication of the NF type of the producer NF 500 and an identification of the producer NF 500.

In step 502, the NRF 410 stores the registration information associated with an identity of the producer NF.

In step 503, the NRF 410 may indicate to the producer NF 500 that the registration has been made.

In some examples, once the consumer NF 400 and the producer NF 500 have registered with the NRF 410, the consumer NF requests an access token from the NRF 410.

Figure 6:
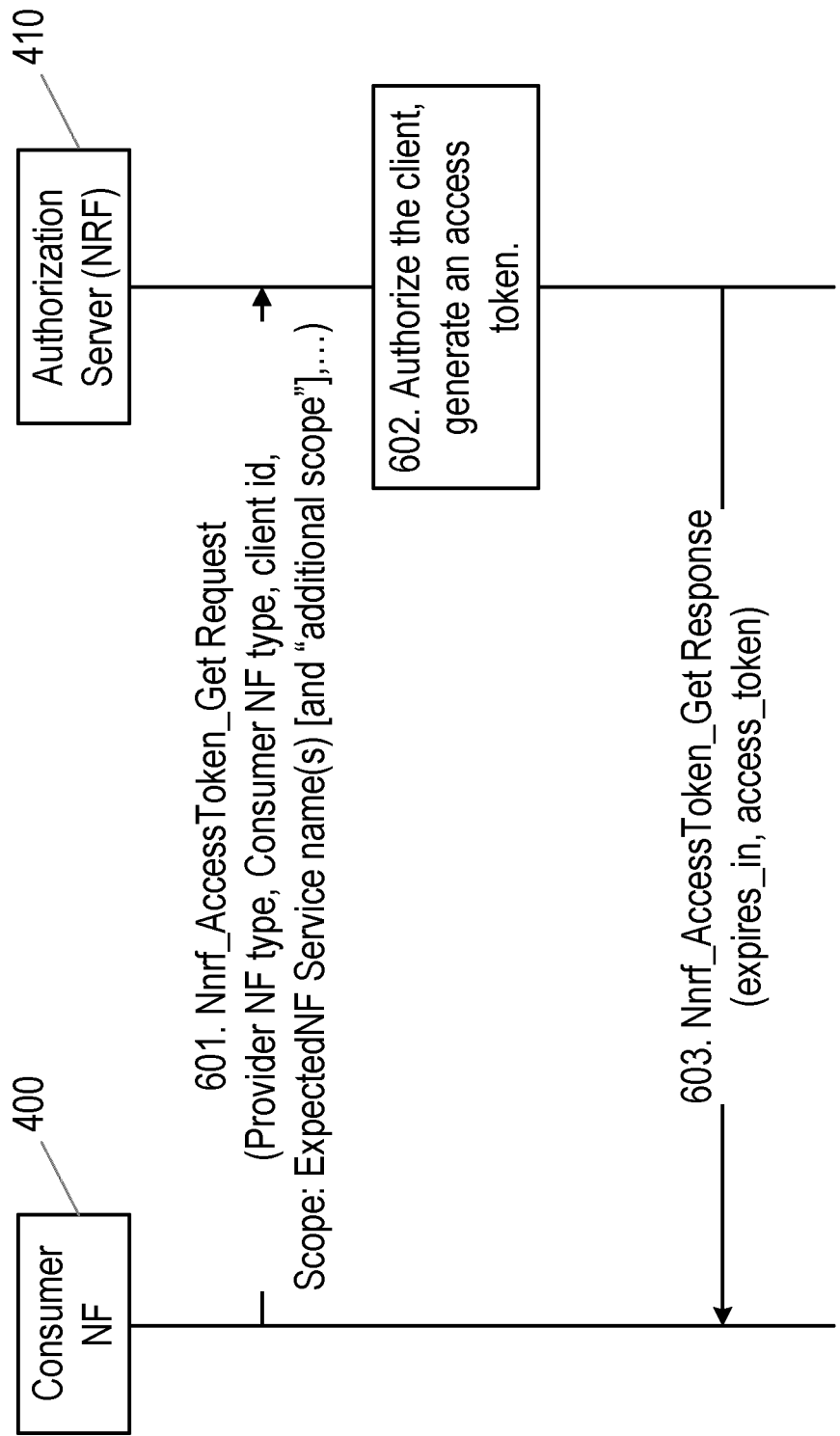
FIG. 6 is an example signalling diagram illustrating how the consumer NF requests an access token from the NRF.

FIG. 6 is an example signalling diagram illustrating how the consumer NF 400 requests an access token from the NRF 410.

In step 601, the consumer NF 400 transmits an access token request to the NRF 410. The access token request may, in some examples, comprise an indication of one or more expected services (Expected NF Service name(s)).

In some examples, the access token request comprises an indication of a target network function type (Producer NF type) expected to provide the expected services. In some examples, the access token request comprises an indication of the consumer NF type (Consumer NF type). In some examples, the access token request comprises an indication of requested resources and operations associated with each resource of the one or more expected services ("additional scope" info).

In step 602, the NRF 410 authorises the consumer NF and generates an access token. In other words, step 602 may comprise determining, based on the requesting consumer NF type and on stored indications of resources and operations associated with each resource of the one or more services that are allowed per network function consumer type, which are the authorised resources and operations associated with each resource of the one or more expected services.

In some examples, the step of determining comprises determining the authorised resources and operations associated with each resource of the one or more expected services based on stored registered information associated with one or more producer network functions, and the access token request. In some examples, the determination is further based on stored registered information associated with the requesting consumer network function type and optionally consumer network function subtype.

For example, when the NRF 410 receives the access token request that indicates the expected services that the consumer NF is requesting access for, the NRF 410 may check the requested expected services and, if present the requested additional scope for those expected services against the stored registration information in NF profiles for producer NFs of the target NF type to ascertain whether the consumer NF type (and optionally subtype) is allowed access to those expected services, and if so which resources and operations associated with each resource of the expected services is the consumer NF type allowed access to.

It will be appreciated that the NRF may not authorise all services and additional scope requested by the consumer NF in the access token request. For example, the authorised resources and operations associated with each resource of the one or more expected services may be a subset of the requested resources and operations associated with each resource of the one or more expected services or a subset of all resources and operations associated with each resource of the one or more expected services (if for example no additional scope is specified in the access token request).

In generating the access token, the NRF 410 may digitally sign the access token based on a shared secret or private key.

In step 603 the NRF 410 transmits an access token to the consumer NF 400, wherein the access token comprises an indication of authorised resources and operations associated with each resource of the one or more expected services.

In some examples, the access token further comprises one or more of: an indication of a target network function type, an identification of the NRF 410, and identification of the consumer NF 400, an expiration time for the access token.

It will be appreciated that in some examples, the consumer NF may not be authorised to access any of the expected services (or any of the requested additional scope for the expected services). In these examples, the NRF 410 may response with an error response.

Figure 7:
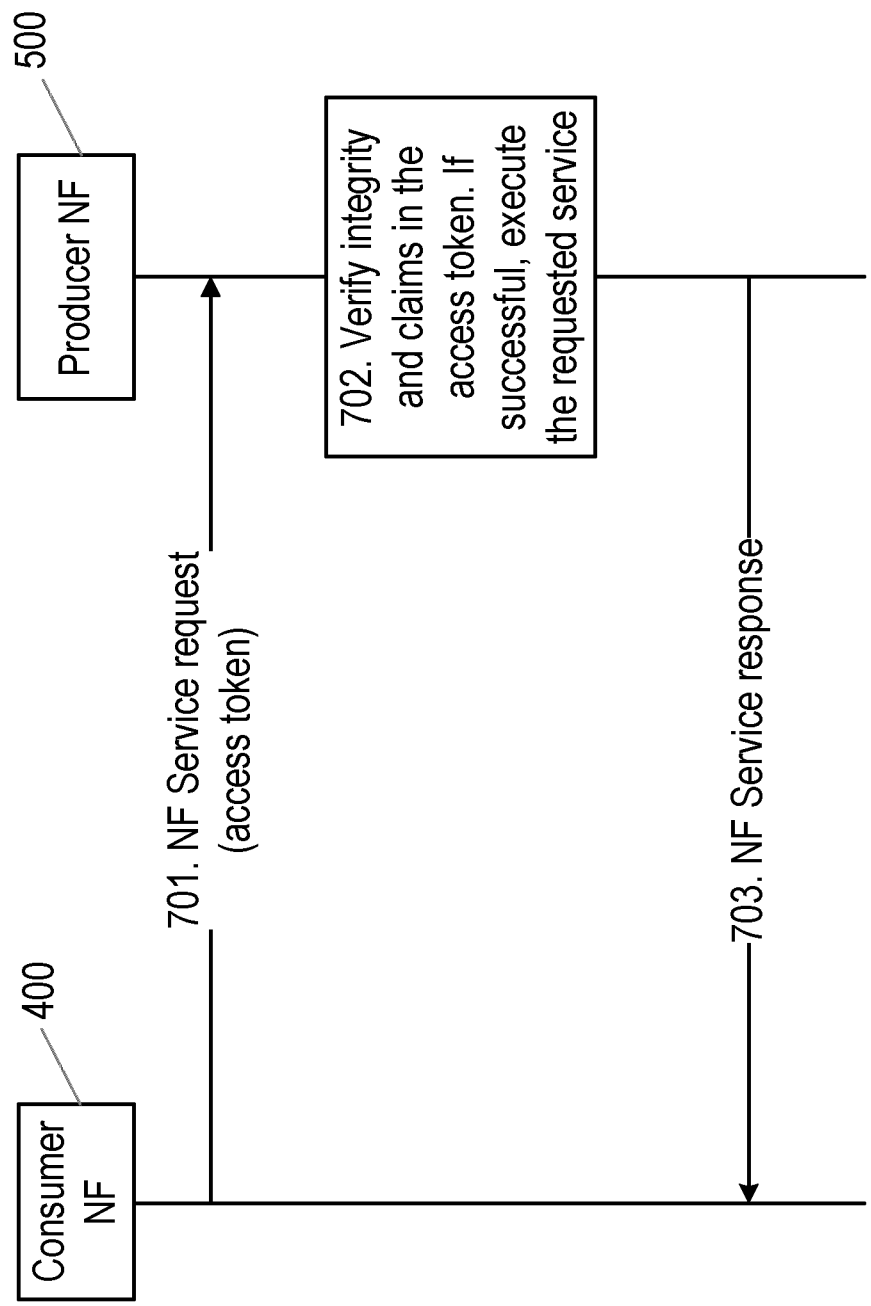
FIG. 7 is a signalling diagram illustrating an example of how the consumer NF 40 accesses the services of the producer NF.

FIG. 7 is a signalling diagram illustrating an example of how the consumer NF 400 accesses the services of the producer NF 500.

In step 701, the consumer NF transmits a service request to a producer network function, wherein the service request comprises: the access token; and a requested operation over a requested resource.

In step 702 the producer NF 500 may then verify the integrity of the access token. For example, the producer NF 500 may check that the access token was generated by the NRF 410. For example, the producer NF may verify the signature in the access token using the private key or shared secret.

The producer NF 500 may also, responsive to the access token generated by the NRF and received in the service request, check that a target network function type in the access token is a type of the producer NF 500.

As the access token comprises an indication of authorised resources and operations associated with each resource of the one or more services, the producer NF 500 may check that the requested operation over the requested resource falls within the authorised resources and operations associated with each resource of the one or more services.

If the requested operation over the request resource does fall within the authorised resources and operations associated with each resource of the one or more services, then the producer NF 500 may determine that the consumer NF is authorised to use the requested operation over the requested resource, and may execute the requested operation over the requested resource.

For example, the producer NF 500 may transmit a NF service response to the consumer NF 400 in step 703.

In some examples, the producer NF 500 may also check that the expiration timer in the access token has not expired before executing the requested operation.

Figure 8A:
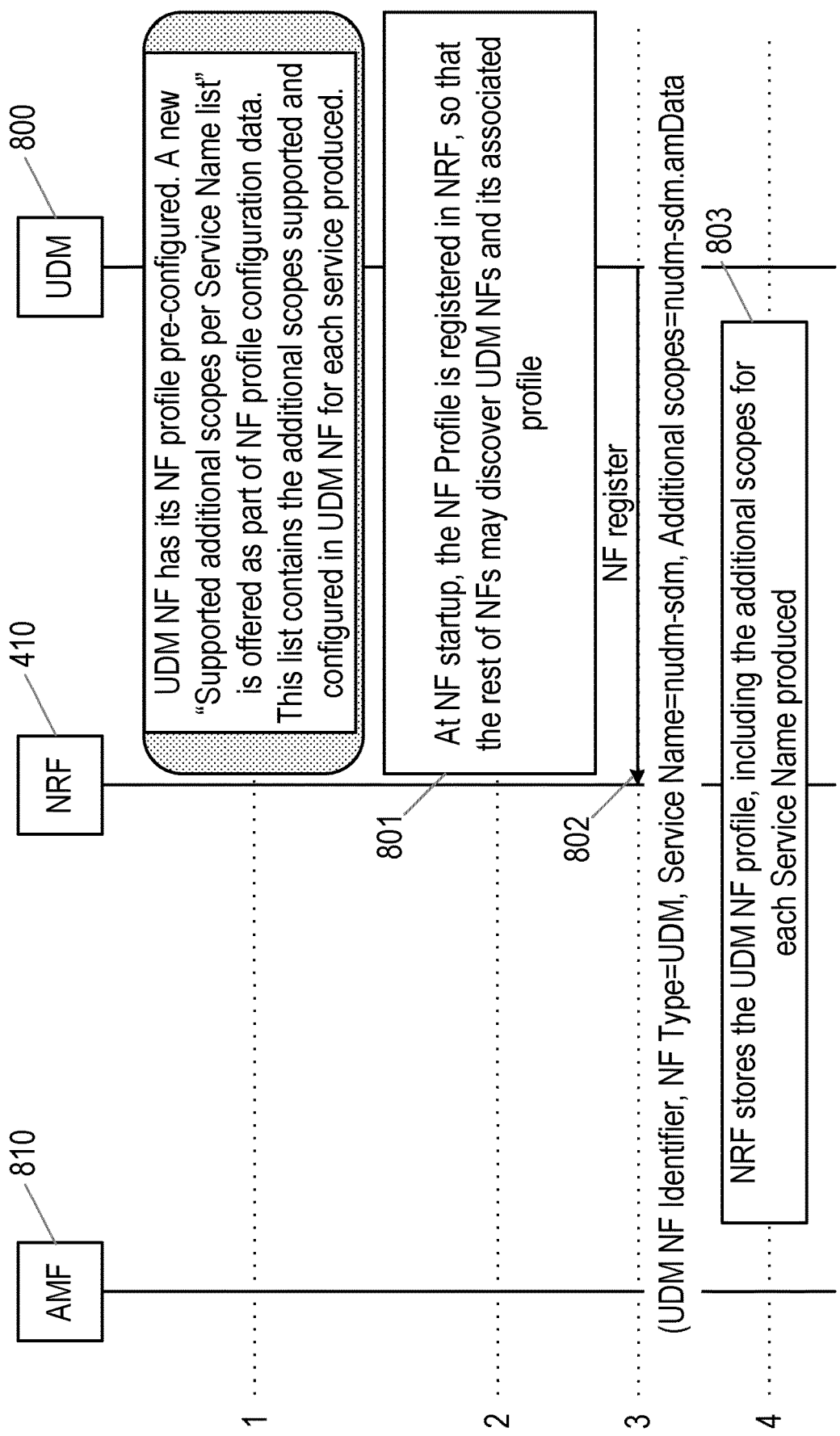
FIGS. 8a and 8b are a signalling diagram illustrating an example of registration of a UDM NF acting as a producer NF and an AMF NF acting as a consumer NF with an NRF.
Figure 8B:
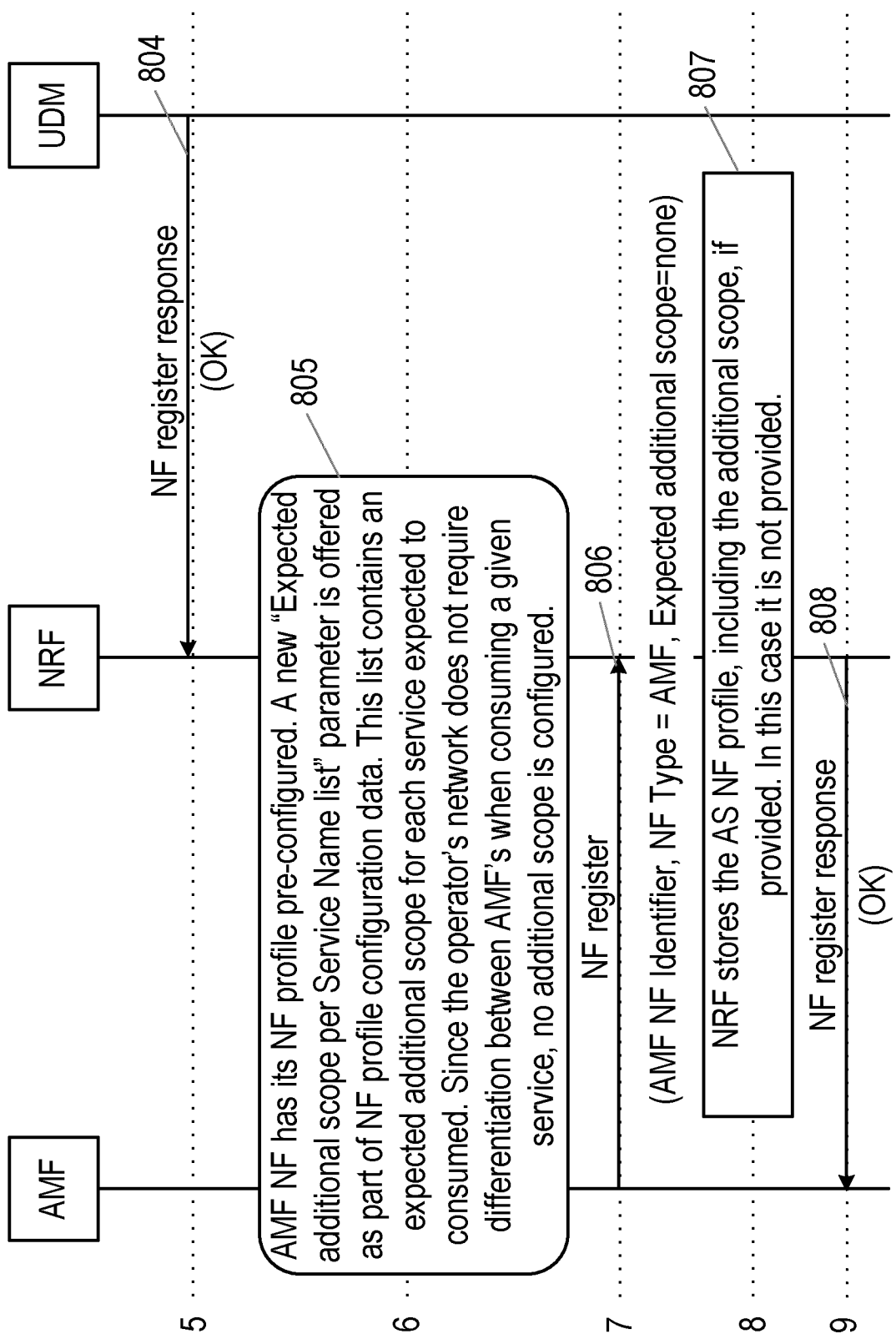

FIGS. 8a and 8b are a signalling diagram illustrating an example of registration of a UDM NF 800 acting as a producer NF and an AMF NF 810 acting as a consumer NF with an NRF 410.

The UDM NF 800 has a NF profile preconfigured. The NF profile may comprise an indication of supported additional scope information per service name list. This indication may contain the additional scope information (e.g. the resources and operations associated with each resource of the one or more services provided by the UDM that are allowed registered per network function consumer type (and optionally subtype)).

In step 801, the UDM NF 800 is instantiated.

In step 802, the UDM transmits a registration request to the NRF 410. This step may be similar to step 501 of FIG. 5. In this example, the one or more services provided by the UDM NF comprises only nudm-sdm (as an example illustrated). The indication of resources and operations associated with each resource of the one or more services that are allowed per network function consumer type comprises: any operation utilising the amData for the NF type "UDM". It will be appreciated that more operations and resources may be allowed for different consumer NF types and optionally subtypes. The allowed resources and operations for NF type "UDM" is only illustrated here for simplicity.

In step 803, the NRF stores the registration information similarly to as described in step 502 of FIG. 5, In step 804, the NRF 410 may indicate to the UDM 800 that the registration has been made (similarly to step 503 of FIG. 5).

In step 805 the AMF NF 810 is instantiated. The AMF NF may have a NF profile preconfigured. In some examples, the NF profile may be configured with an indication of a subtype of the AMF NF. In this example, since the operator's network does not require differentiation between AMF NFs when consuming a given service, there may be no indication of the subtype of the AMF NF.

In step 806 the AMF NF 810 transmits a registration request to the NRF 410. In this example, the registration request comprises registration information comprising an indication of the consumer network function type (NF type) and an identification of the consumer NF (AMF NF Identifier) (similarly to as described in step 401 of FIG. 4).

In step 807, the NRF 410 stores the registration information as an AMF NF profile (similarly to as described in step 402 of FIG. 4).

In step 808 the NRF 410 may indicate to the AMF NF 810 that the registration has been made (similar to as described in step 403 of FIG. 4).

Figure 9A:
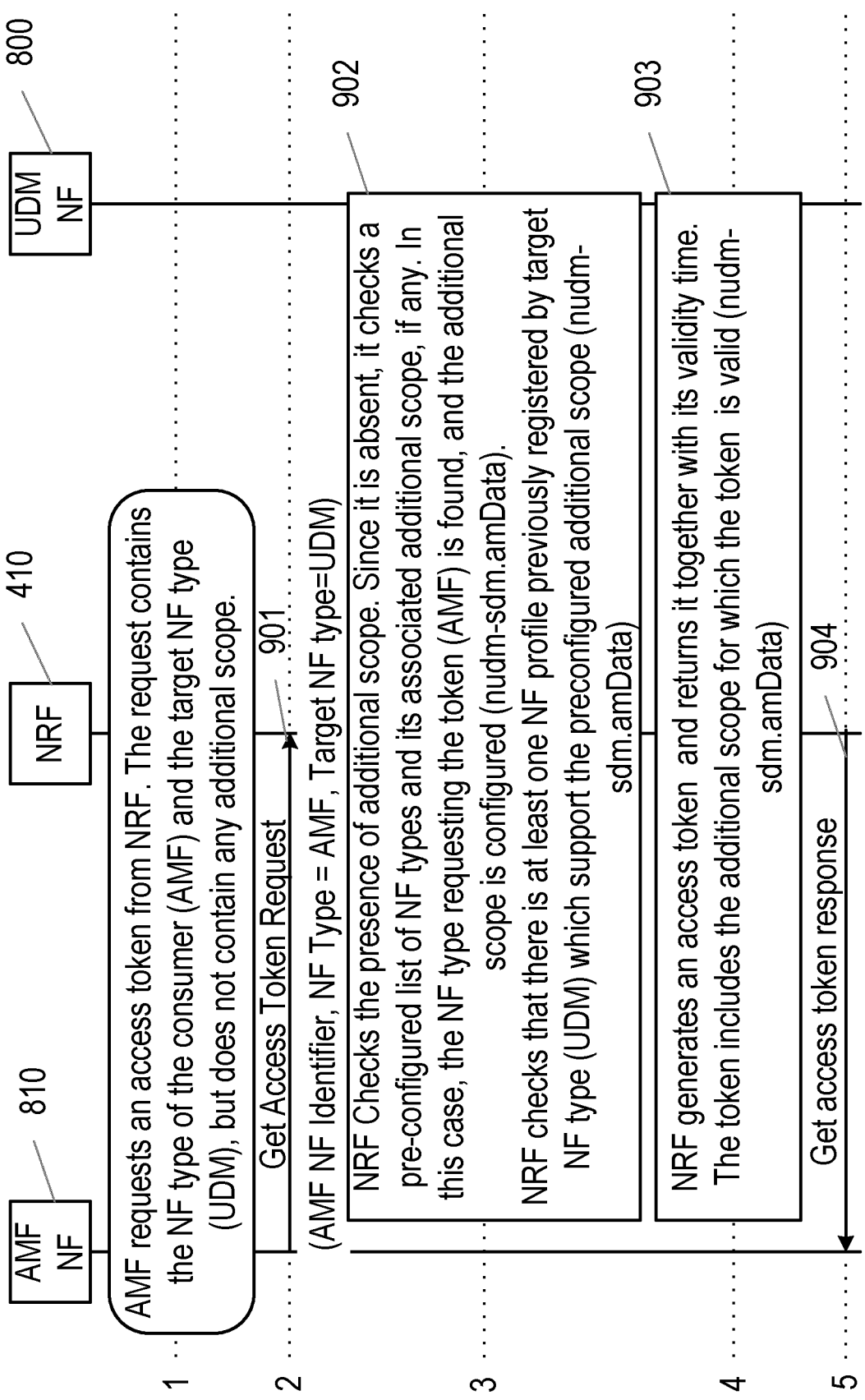
FIGS. 9a to 9c are a signalling diagram illustrating an example of how the AMF NF requests authorisation and accesses specific services.
Figure 9B:
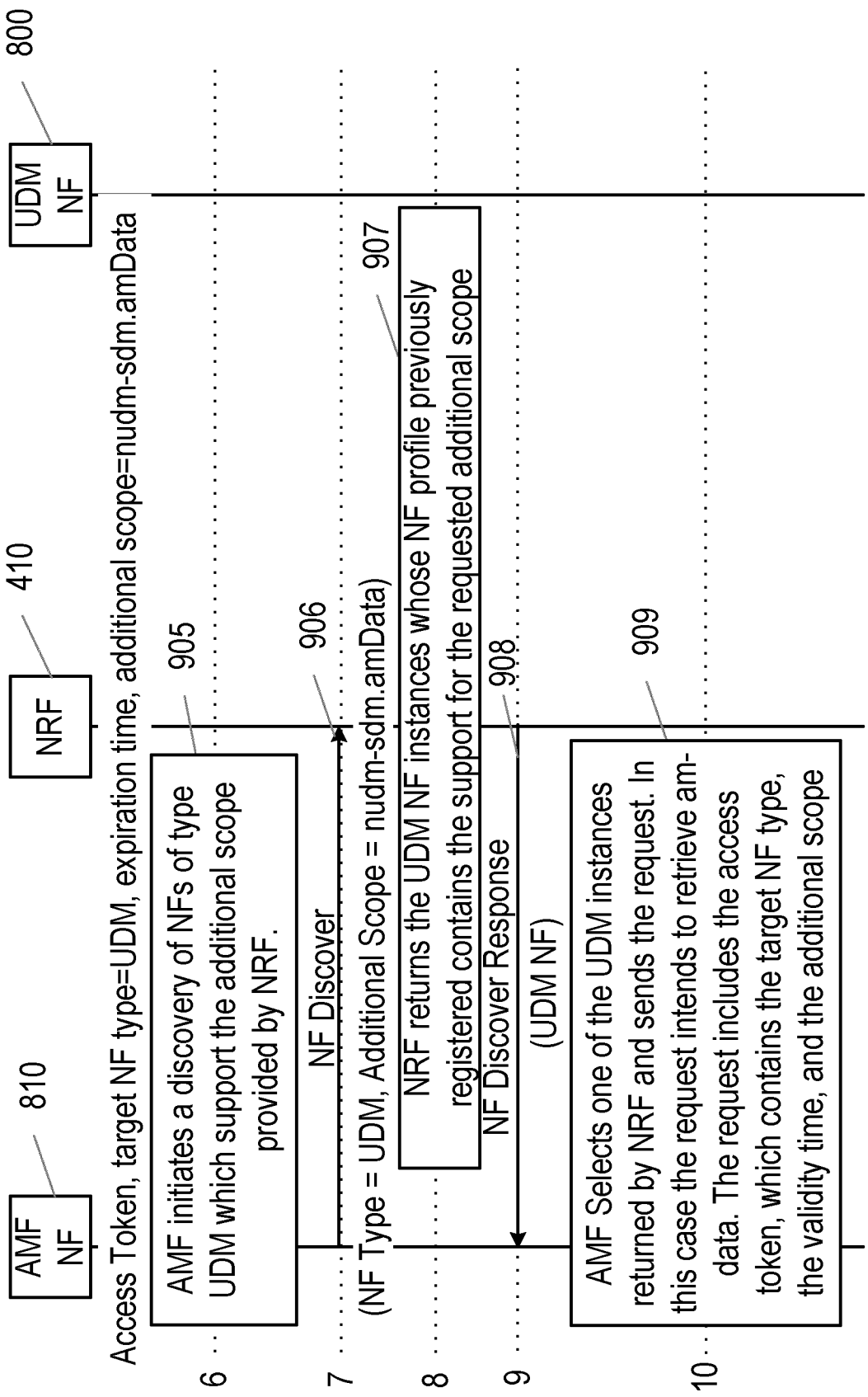
Figure 9C:
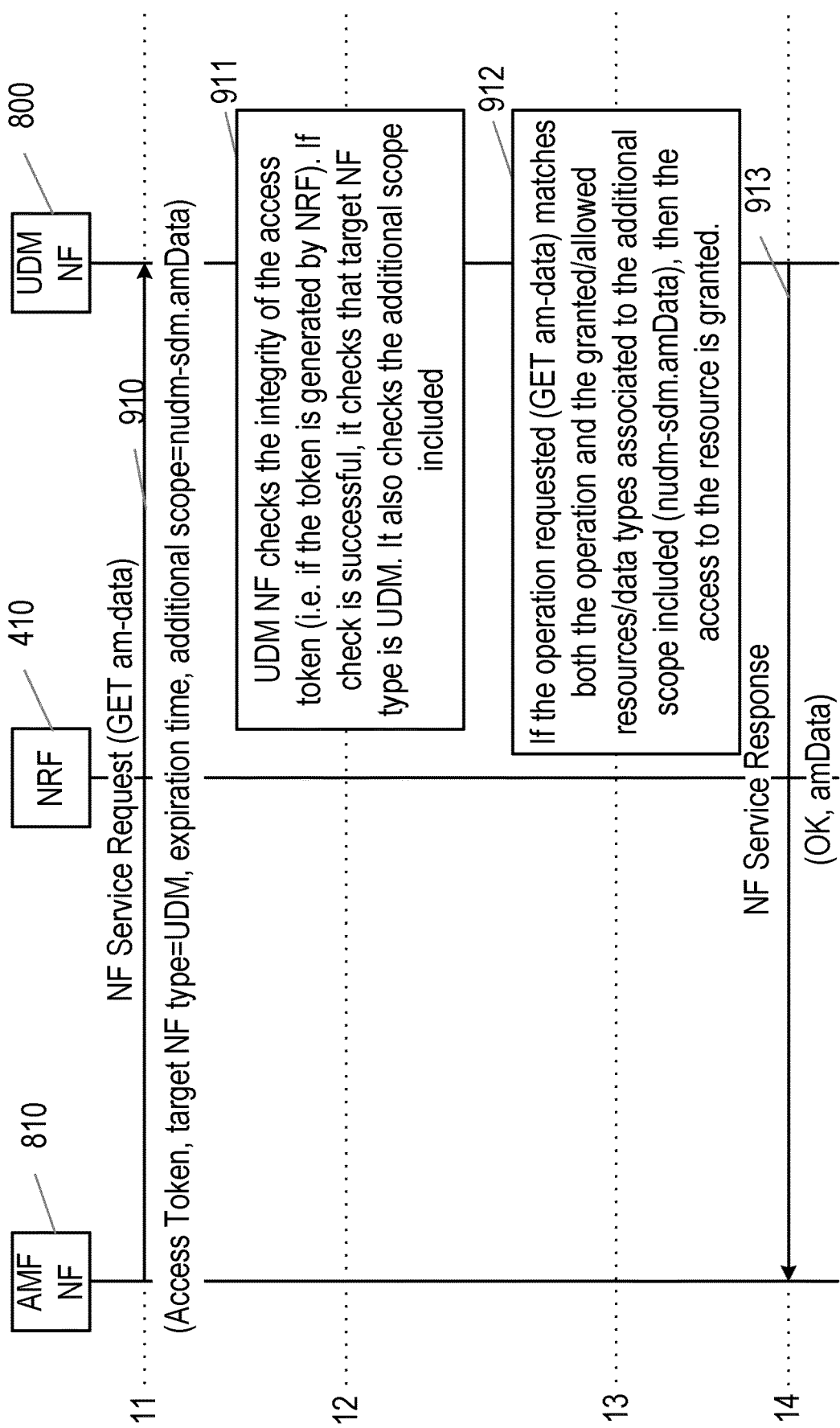

FIGS. 9a to 9c are an example signalling diagram illustrating how the AMF NF 810 requests authorisation and accesses specific services.

In step 901, the AMF NF 810 transmits an access token request to the NRF 410 (similarly to as described in step 601 of FIG. 6). In this example, the access token request comprises an indication of a target NF type, which in this example is "UDM". In this example, the access token request does not comprise an indication of one or more expected services (Expected NF Service name(s)). This may be because the one or more expected services requested by AMF NFs is preconfigured, for example at the NRF. The NRF may therefore already be aware of what services the AMF is requesting without it having to be specified in the access token request.

The access token request may also comprise an indication of the AMF NF identifier and the consumer NF type, which in this example is "AMF".

In step 902, the NRF checks the access token request for the presence of an indication of one or more expected services (Expected NF Service name(s)), and optionally an indication of requested resources and operations associated with each resource of the one or more expected services.

In this example, as there is no indication of resources and operations associated with each resource of the one or more expected services in the access token request, the NRF may then check for a local configuration of resources and operations associated with each resource of the one or more expected services in the access token request associated with the NF type "AMF". In this example, it may be preconfigured at the NRF that NF type "AMF" is preconfigured to request access to the "amData" resource (access and management data) for the service "nudm-sdm". In other words, it may be expected that the AMF requests access to the access and management data resource.

Another NF type, for example "SMF", may be preconfigured to request access to a different resource, for example "smData" (session management data). In other words, it may be expected that an SMF NF would request access to session management data.

The NRF may also check that there is at least one registered producer NF of the target NF type (e.g. "UDM") that has associated registration information that indicates that the NF type "AMF" would be authorised to access the "amData" resource.

In step 903, the NRF 410 then generates an access token (similarly to as described with reference to step 602 of FIG. 6).

In step 904, the NRF 410 transmits the access token to the AMF NF 810 (similarly to as described with reference to step 603 of FIG. 6). The access token comprises an indication of authorised resources and operations associated with each resource of the one or more expected services (which in this example comprises the resource "amData").

In some examples, the access token further comprises one or more of: an indication of a target network function type, an identification of the NRF 410, and identification of the AMF NF 810, an expiration time for the access token.

In this example, in step 905, the AMF NF 810 transmits, to the NRF 410, a discovery request comprising an indication of the target network function type (e.g. "UDM") and an indication of authorised resources and operations associated with each resource of the one or more expected services (e.g. "amData").

In step 907, the NRF 410 locates one or more producer network functions of the target network function type capable of providing the authorised resources and operations associated with each resource of the one or more expected services. In this example, the NRF may locate any stored NF profiles for NFs of the type "UDM" for which the resource "amData" is authorised for use by NFs of the type "AMF".

In step 908, the NRF 410 transmits a discovery response to the AMF NF 810 comprising the one or more producer network functions of the target network function type capable of providing the authorised resources and operations associated with each resource of the one or more expected services.

In step 909, the AMF NF 810 selects a producer network function from the one or more producer network functions of the discovery response.

In step 910, the AMF NF 810 transmits a service request to a selected UDM NF 800. The service request comprises: the access token; and a requested operation over a requested resource (similarly to as described in step 701 of FIG. 7). In this example, the requested operation is "GET" and the requested resource is "amData".

In step 911 the UDM NF 800 may then verify the integrity of the access token. For example, the UDM NF 800 may check that the access token was generated by the NRF 410. For example, the UDM NF 800 may verify the signature in the access token using the private key or shared secret.

The UDM NF 800 may also check that the target NF type in the service request is "UDM".

In step 912, the UDM NF 800 checks that the requested operation (e.g. "GET") over the requested resource (e.g. "amData") falls within the authorised resources and operations associated with each resource of the one or more services (e.g. the authorised resources and operations indicated in the access token) (Similarly to as in step 702 of FIG. 7).

In this example as the access token indicates that the resources "amData" are authorised, it may be assumed that all operations (e.g. "GET") utilising the resources "amData" are authorised. The UDM NF 800 may then grant access to the requested operation over the requested resource.

In step 913 the UDM NF 800 transmits a NF service response to the AMF NF 810 (similarly to as in step 703 of FIG. 7).

Figure 10A:
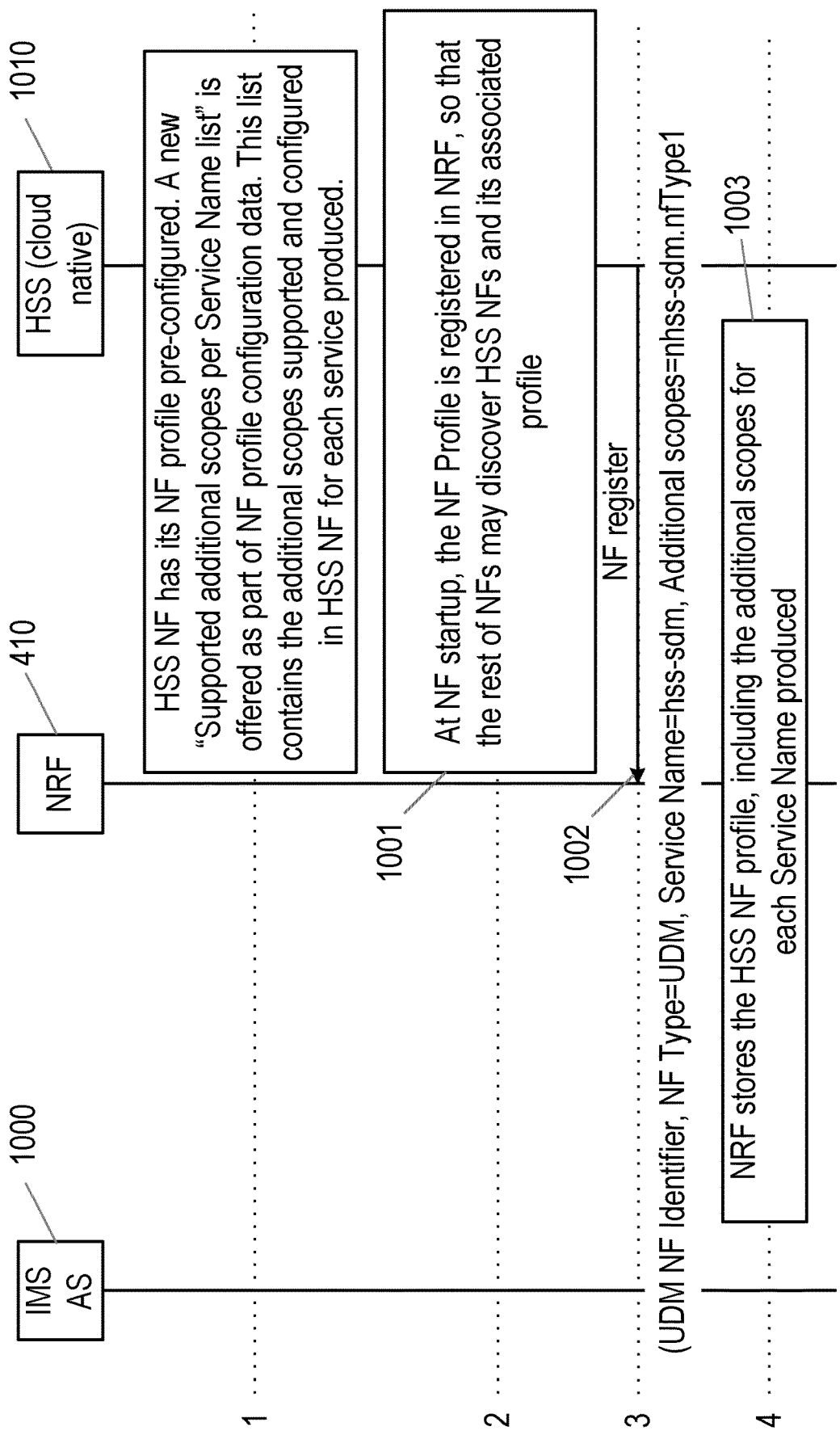
FIGS. 10a and 10b are a signalling diagram illustrating an example of registration of an IMS Application Server (AS) acting as a consumer NF and a Home Subscriber Server (HSS) acting as a producer NF with an NRF.
Figure 10B:
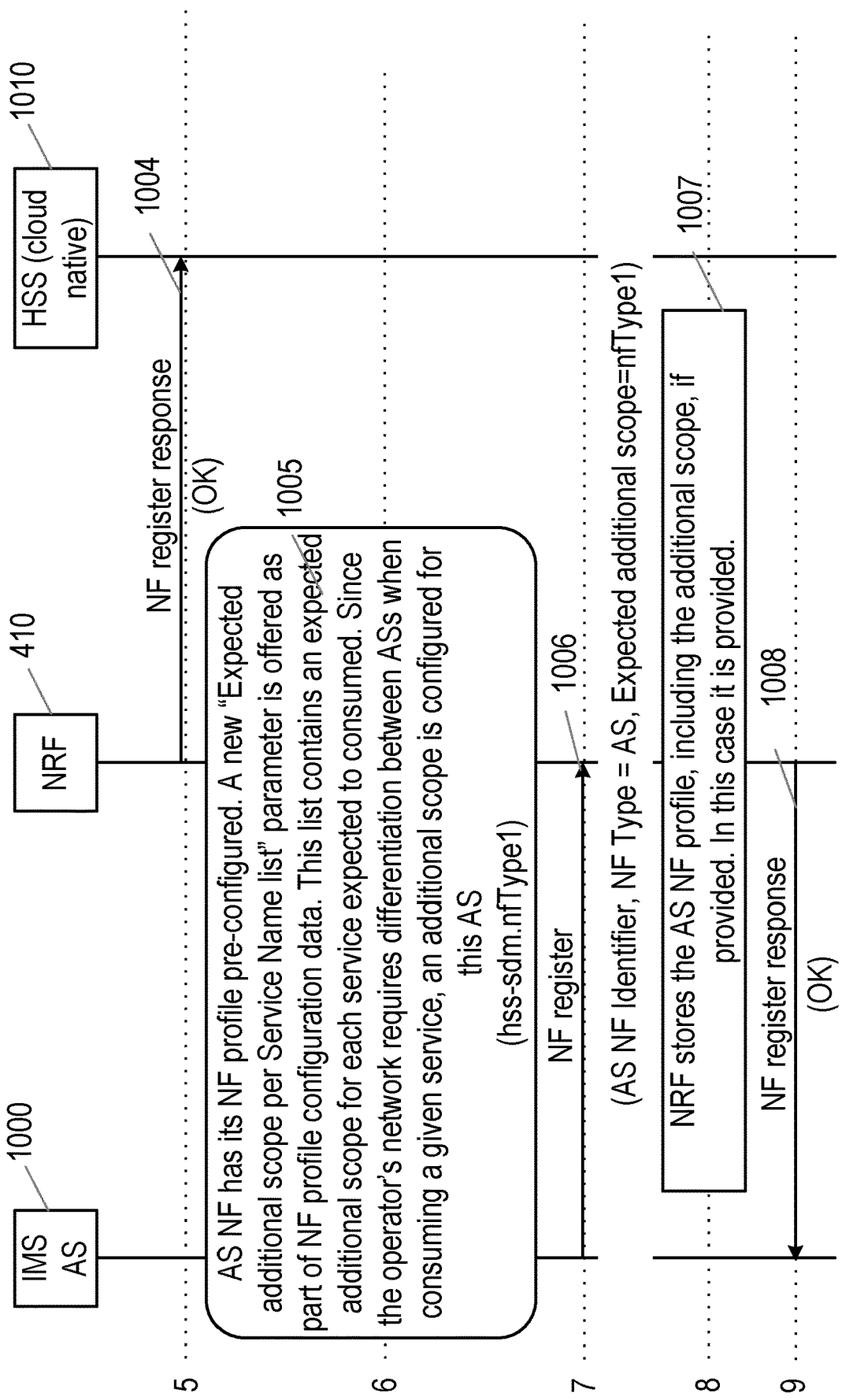

FIGS. 10*a* and 10*b* are a signalling diagram illustrating an example of registration of an IMS Application Server (AS) 1000 acting as a consumer NF and a Home Subscriber Server (HSS) 1010 acting as a producer NF with an NRF 410.

The HSS 1010 has a NF profile preconfigured. The NF profile may comprise an indication of supported additional scope information per service name list. This indication may contain the additional scope information (e.g. the resources and operations associated with each resource of the one or more services provided by the HSS that are allowed registered per network function consumer type (and optionally subtype)).

In step 1001, the HSS 1010 is instantiated.

In step 1002, the HSS 1010 transmits a registration request to the NRF 410. This step may be similar to step 501 of FIG. 5. In this example, the one or more services provided by the HSS 1010 comprises for example nhss-sdm, nhss-uecm (as an example). The indication of resources and operations associated with each resource of the one or more services that are allowed per network function consumer type comprises: only nhss-sdm for NF subtype "nfType1". It will be appreciated that more operations and resources may be allowed for different NF types and/or subtypes. Only the allowed resources and operations for NF subtype "nfType1" is illustrated here for simplicity.

In step 1003, the NRF stores the registration information similarly to as described in step 502 of FIG. 5, In step 1004, the NRF 410 may indicate to the HSS 1010 that the registration has been made (similarly to step 503 of FIG. 5).

In step 1005 the IMS AS 1000 is instantiated. The IMS AS 1000 may have a NF profile preconfigured. In some examples, the NF profile may be configured with an indication of one or more services that are expected to be consumed by the IMS AS 1000; and an indication of resources and operations associated with each resource of the one or more services that are expected to be consumed. In this example, since the operator's network in this example requires differentiation between AS's when consuming a given service, the NF profile comprises an indication of the subtype of the IMS AS 1000 which in this example is given as "nfType1".

In step 1006, the IMS AS 1000 transmits a registration request to the NRF 410. In this example, the registration request comprises registration information comprising an indication of the consumer network function type (NF type) and an identification of the consumer NF (AS NF Identifier) (similarly to as described in step 401 of FIG. 4). In this example, the registration information further comprises the subtype of the IMS AS 1000 "nfType1".

In step 1007, the NRF 410 stores the registration information as an IMS AS NF profile (similarly to as described in step 402 of FIG. 4).

In step 1008 the NRF 410 may indicate to the IMS AS 1000 that the registration has been made (similar to as described in step 403 of FIG. 4).

Figure 11A:
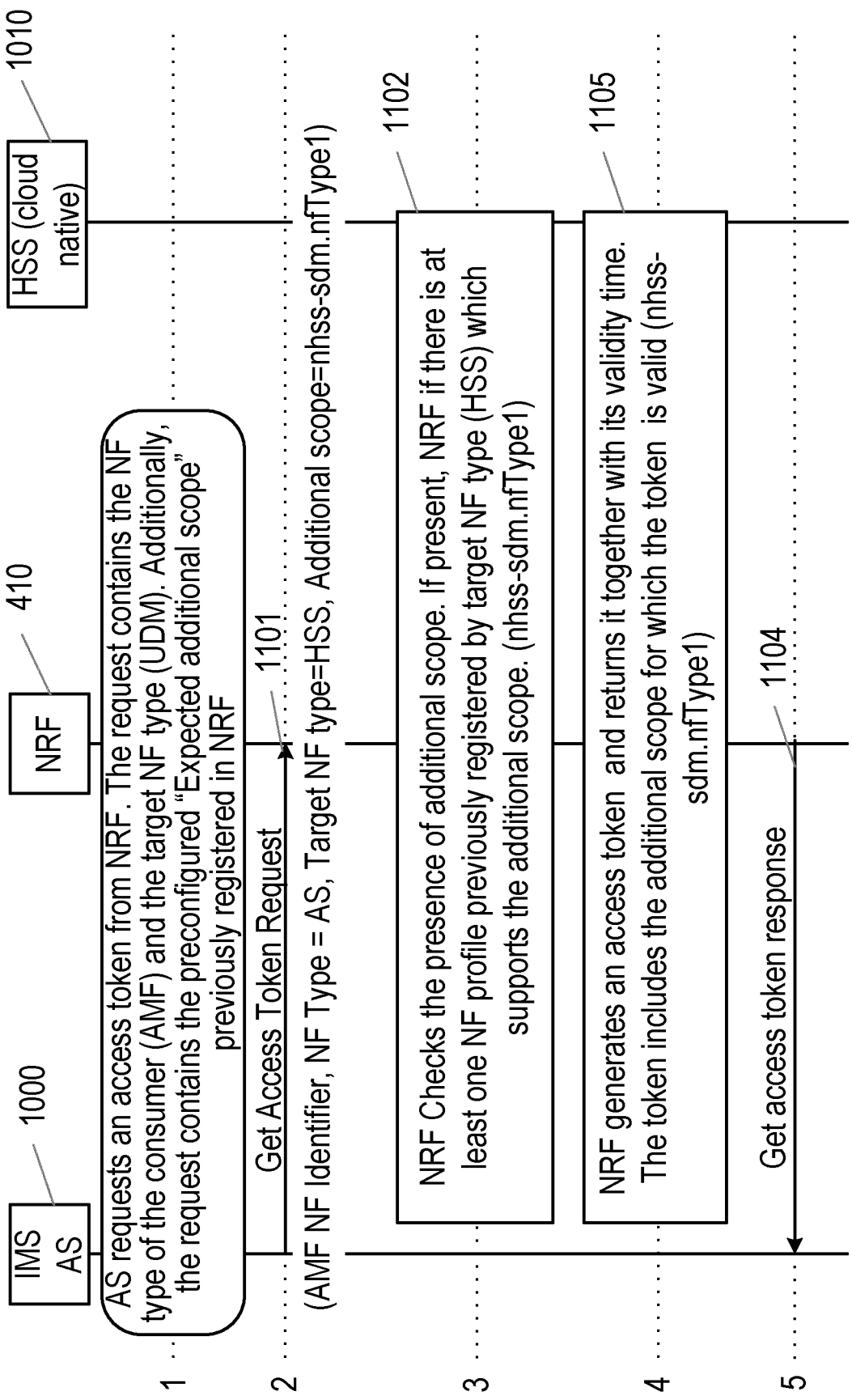
FIGS. 11a to 11c are an example signalling diagram illustrating how an IMS Application Server (AS) requests authorisation and accesses specific services from a Home Subscriber Server (HSS)
Figure 11B:
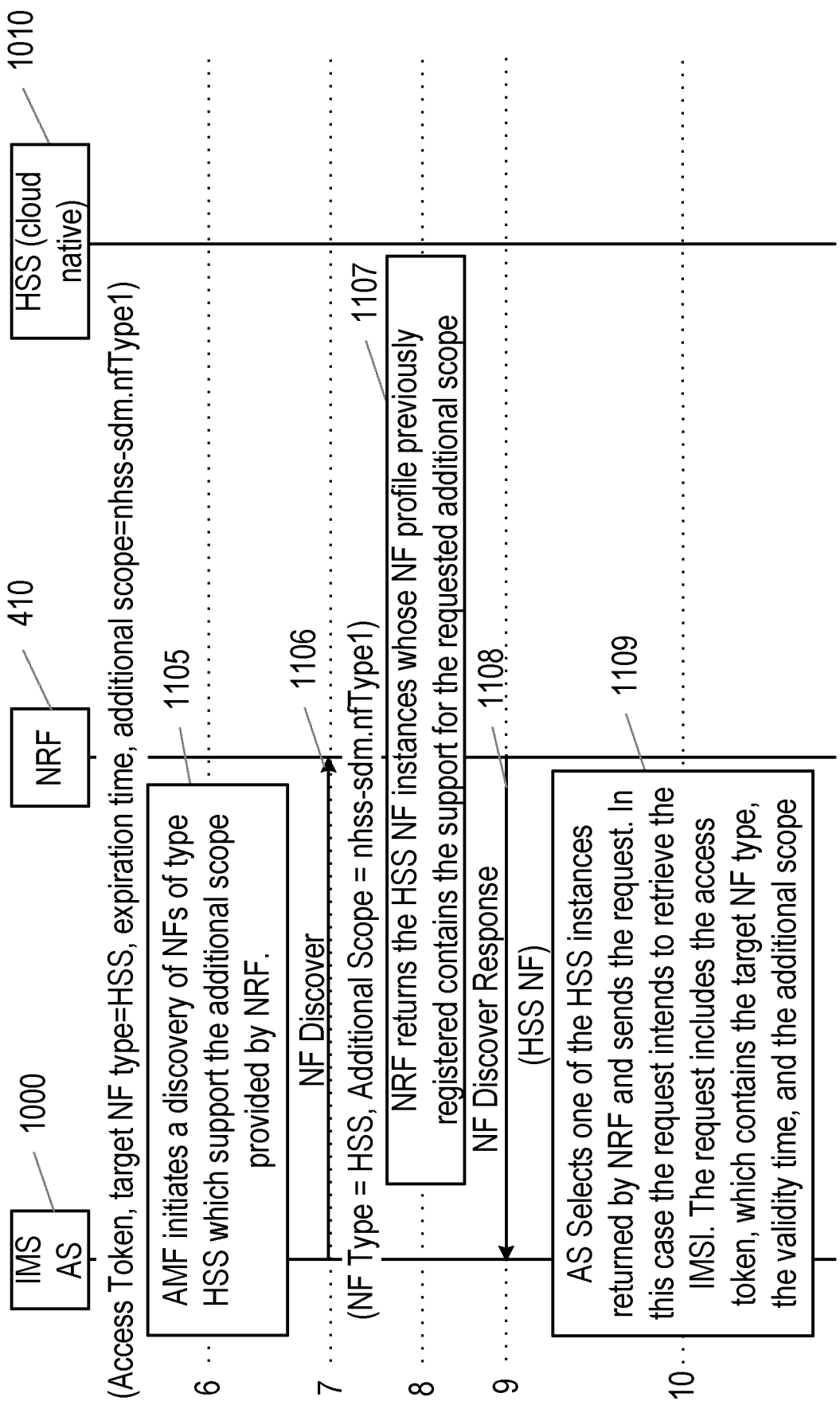
Figure 11C:
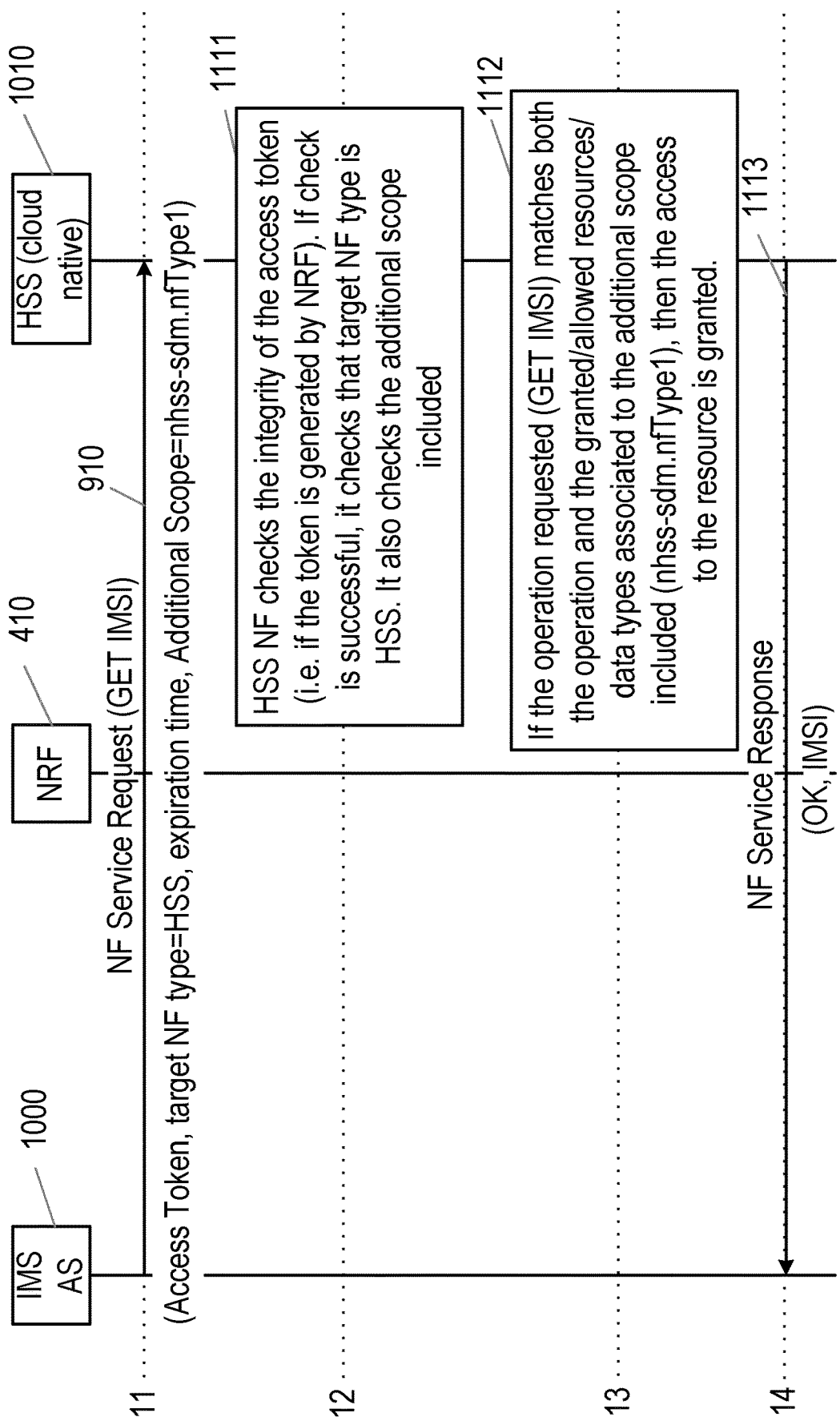

FIGS. 11a to 11c are an example signalling diagram illustrating how an IMS Application Server (AS) 1000 requests authorisation and accesses specific services from a Home Subscriber Server (HSS) 1010.

In step 1101, the IMS AS 1000 transmits an access token request to the NRF 410 (similarly to as described in step 601 of FIG. 6). In this example, the access token request comprises an indication of a target NF type, which in this example is "HSS".

In this example, the access token request comprises an indication of one or more expected services ("nhss-sdm"). The access token request in this example also include the subtype "nfType1".

The access token request may also comprise an indication of the IMS AS identifier and the consumer NF type, which in this example is "AS".

In step 1102, the NRF checks the access token request for the presence of an indication of one or more expected services (Expected NF Service name(s)), and optionally an indication of requested resources and operations associated with each resource of the one or more expected services. In this example, the NRF locates the expected service "nhss-sdm".

The NRF may also check that there is at least one registered producer NF of the target NF type (e.g. "HSS") that has associated registration information that indicates that an NF of type "AS" and subtype "nfType1" would be authorised to access the service "nhss-sdm".

In step 1103, the NRF 410 then generates an access token (similarly to as described with reference to step 602 of FIG. 6).

In step 1104, the NRF 410 transmits the access token to the IMS AS 1000 (similarly to as described with reference to step 603 of FIG. 6). The access token comprises an indication of authorised resources and operations associated with each resource of the one or more expected services (which in this example comprises the access to the service "nhss-sdm").

In some examples, the access token further comprises one or more of: an indication of a target network function type, an identification of the NRF 410, and identification of the IMS AS 1000, an expiration time for the access token.

In this example, in steps 1105 and 1106, the IMS AS 1000 transmits, to the NRF 410, a discovery request comprising an indication of the target network function type (e.g. "HSS") and an indication of authorised resources and operations associated with each resource of the one or more expected services (e.g. "nhss-sdm").

In step 1107, the NRF 410 locates one or more producer network functions of the target network function type capable of providing the authorised resources and operations associated with each resource of the one or more expected services. In this example, the NRF may locate any stored NF profiles for NFs of the type "HSS" for which the service "nhss-sdm" is authorised for use by NFs of the type "AS" and the subtype "nfType1".

In step 1108, the NRF 410 transmits a discovery response to the IMS AS 1000 comprising the one or more producer network functions of the target network function type capable of providing the authorised resources and operations associated with each resource of the one or more expected services.

In step 1109, the IMS AS 1000 selects a producer network function from the one or more producer network functions in the discovery response.

In step 1110, the IMS AS 1000 transmits a service request to a selected HSS 1010. The service request comprises: the access token; and a requested operation over a requested resource (similarly to as described in step 701 of FIG. 7). In this example, the requested operation is "GET" and the requested resource is "IMSI".

In step 1111 the HSS 1010 may then verify the integrity of the access token. For example, the HSS 1010 may check that the access token was generated by the NRF 410. For example, the HSS 1010 may verify a signature in the access token using a private key or shared secret.

The HSS 1010 may also check that the target NF type in the service request is "HSS".

In step 1112, the HSS 1010 checks that the requested operation (e.g. "GET") over the requested resource (e.g. "IMSI") falls within the authorised resources and operations associated with each resource of the one or more services (e.g. the authorised resources and operations indicated in the access token) (similarly to as in step 702 of FIG. 7).

In step 1113 the HSS 1010 transmits a NF service response to the IMS AS 1000 (similarly to as in step 703 of FIG. 7).

Figure 12:
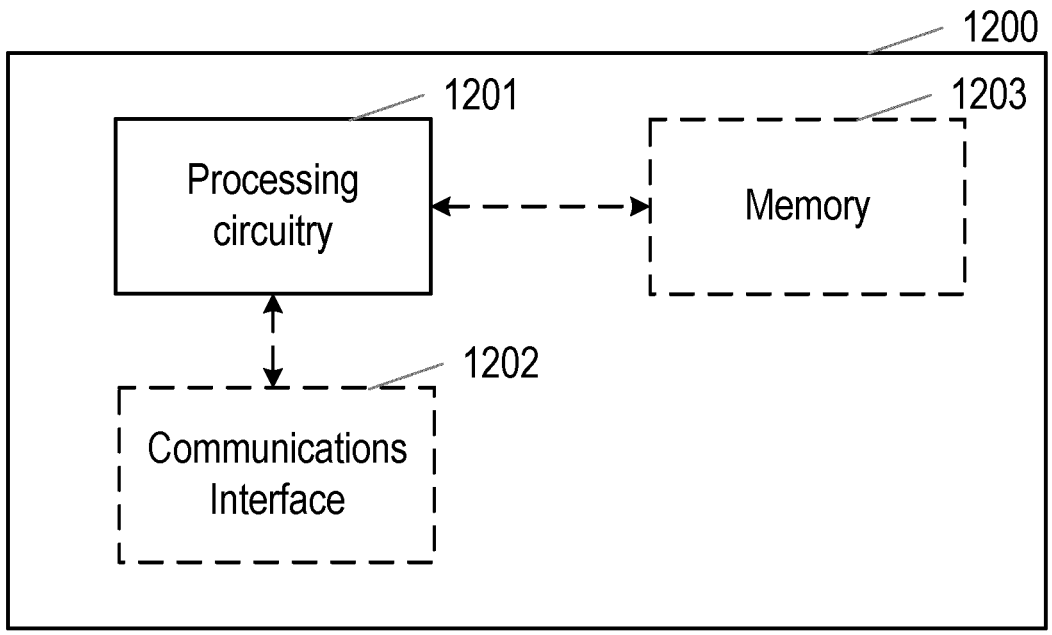
FIG. 12 illustrates a producer NF comprising processing circuitry (or logic)

FIG. 12 illustrates a producer NF 1200 comprising processing circuitry (or logic) 1201. It will be appreciated that the producer NF 1200 may comprise one or more virtual machines running different software and/or processes. The producer NF 1200 may therefore comprise one or more servers, switches and/or storage devices and/or may comprise cloud computing infrastructure that runs the software and/or processes.

The producer NF 1200 may comprise the producer NF 500 as described above. The processing circuitry 1201 controls the operation of the producer NF 1200 and can implement the method described herein in relation to a producer NF 1200. The processing circuitry 1201 can comprise one or more processors, processing units, multi-core processors or modules that are configured or programmed to control the producer NF 1200 in the manner described herein. In particular implementations, the processing circuitry 1201 can comprise a plurality of software and/or hardware modules that are each configured to perform, or are for performing, individual or multiple steps of the method described herein in relation to the producer NF 500, HSS 1010 or UDM NF 800.

Briefly, the processing circuitry 1201 of the producer NF 1200 is configured to: transmit a registration request to the NRF, wherein the registration request comprises registration information comprising: an indication of the one or more services; and an indication of resources and operations associated with each resource of the one or more services that are allowed per network function consumer type In some embodiments, the producer NF 1200 may optionally comprise a communications interface 1202. The communications interface 1202 of the producer NF 1200 can be for use in communicating with other nodes, such as other virtual nodes. For example, the communications interface 1202 of the producer NF 1200 can be configured to transmit to and/or receive from other nodes or network functions requests, resources, information, data, signals, or similar. The processing circuitry 1201 of producer NF 1200 may be configured to control the communications interface 1202 of the producer NF 1200 to transmit to and/or receive from other nodes or network functions requests, resources, information, data, signals, or similar.

Optionally, the producer NF 1200 may comprise a memory 1203. In some embodiments, the memory 1203 of the producer NF 1200 can be configured to store program code that can be executed by the processing circuitry 1201 of the producer NF 1200 to perform the method described herein in relation to the producer NF 1200, producer NF 500, HSS 1010 or UDM NF 800. Alternatively or in addition, the memory 1203 of the producer NF 1200, can be configured to store any requests, resources, information, data, signals, or similar that are described herein. The processing circuitry 1201 of the producer NF 1200 may be configured to control the memory 1203 of the producer NF 1200 to store any requests, resources, information, data, signals, or similar that are described herein.

Figure 13:
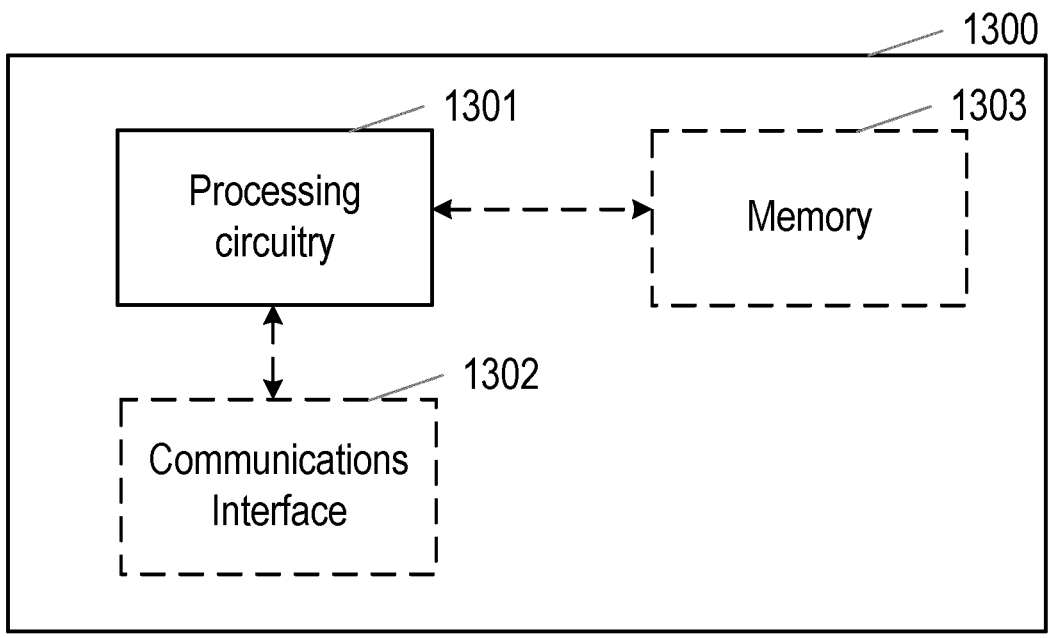
FIG. 13 illustrates a consumer network function (NF) comprising processing circuitry (or logic)

FIG. 13 illustrates a consumer network function (NF) 1300 comprising processing circuitry (or logic) 1301. It will be appreciated that the consumer NF 1300 may comprise one or more virtual machines running different software and/or processes. The consumer NF 1300 may therefore comprise one or more servers, switches and/or storage devices and/or may comprise cloud computing infrastructure that runs the software and/or processes.

The consumer NF 1300 may comprise the consumer NF 400 as described above. The processing circuitry 1301 controls the operation of the consumer NF 1300 and can implement the method described herein in relation to a consumer NF 1300. The processing circuitry 1301 can comprise one or more processors, processing units, multi-core processors or modules that are configured or programmed to control the consumer NF 1300 in the manner described herein. In particular implementations, the processing circuitry 1301 can comprise a plurality of software and/or hardware modules that are each configured to perform, or are for performing, individual or multiple steps of the method described herein in relation to the consumer NF 1300 or consumer NF 400.

Briefly, the processing circuitry 1301 of the consumer NF 1300 is configured to: transmit a registration request to a network repository function, NRF, wherein the registration request comprises: an indication of one or more services that are expected to be consumed; an indication of resources and operations associated with each resource of the one or more services that are expected to be consumed; and an indication of the consumer network function type.

In some embodiments, the consumer NF 1300 may optionally comprise a communications interface 1302. The communications interface 1302 of the consumer NF 1300 can be for use in communicating with other nodes, such as other virtual nodes. For example, the communications interface 1302 of the consumer NF 1300 can be configured to transmit to and/or receive from other nodes or network functions requests, resources, information, data, signals, or similar. The processing circuitry 1301 of consumer NF 1300 may be configured to control the communications interface 1302 of the consumer NF 1300 to transmit to and/or receive from other nodes or network functions requests, resources, information, data, signals, or similar.

Optionally, the consumer NF 1300 may comprise a memory 1303. In some embodiments, the memory 1303 of the consumer NF 1300 can be configured to store program code that can be executed by the processing circuitry 1301 of the consumer NF 1300 to perform the method described herein in relation to the consumer NF 1300 the consumer NF 400, the AMF NF 810 or the IMS AS 1000. Alternatively or in addition, the memory 1303 of the consumer NF 1300, can be configured to store any requests, resources, information, data, signals, or similar that are described herein. The processing circuitry 1301 of the consumer NF 1300 may be configured to control the memory 1303 of the consumer NF 1300 to store any requests, resources, information, data, signals, or similar that are described herein.

Figure 14:
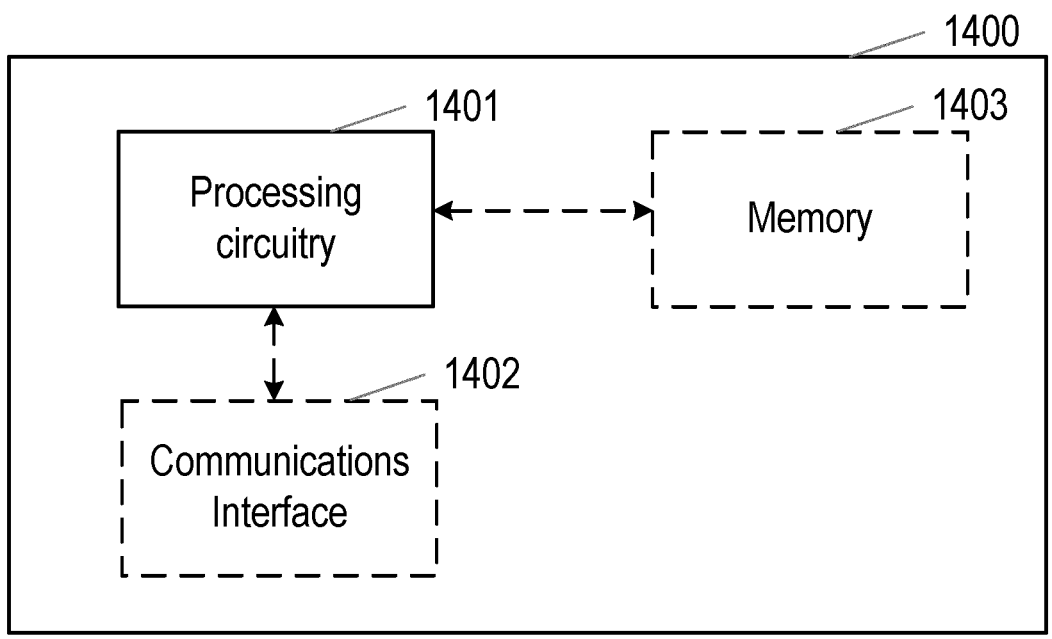
FIG. 14 illustrates a Network Repository Function (NRF) comprising processing circuitry (or logic).

FIG. 14 illustrates a Network Repository Function (NRF) 1400 comprising processing circuitry (or logic) 1401. It will be appreciated that the NRF 1400 may comprise one or more virtual machines running different software and/or processes. The NRF 1400 may therefore comprise one or more servers, switches and/or storage devices and/or may comprise cloud computing infrastructure that runs the software and/or processes.

The NRF 1400 may comprise the NRF 410 as described above. The processing circuitry 1401 controls the operation of the NRF 1400 and can implement the method described herein in relation to an NRF 1400. The processing circuitry 1401 can comprise one or more processors, processing units, multi-core processors or modules that are configured or programmed to control the NRF 1400 in the manner described herein. In particular implementations, the processing circuitry 1401 can comprise a plurality of software and/or hardware modules that are each configured to perform, or are for performing, individual or multiple steps of the method described herein in relation to the NRF 1400 or NRF 410.

Briefly, the processing circuitry 1401 of the NRF 1400 is configured to: receive a registration request from a producer network function, wherein the registration request comprises registration information comprising: an indication of one or more services; and an indication of resources and operations associated with each resource of the one or more services that are allowed per network function consumer type; and store the registration information associated with an identity of the producer network function. In some examples, the processing circuitry 1401 of the NRF 1400 may be further configured to receive a registration request from a consumer network function, wherein the registration request comprises registration information comprising: an indication of one or more services that are expected to be consumed; and an indication of resources and operations associated with each resource of the one or more services that are expected to be consumed; and an indication of the consumer network function type; and store the registration information associated with an identity of the consumer network function.

In some embodiments, the NRF 1400 may optionally comprise a communications interface 1402. The communications interface 1402 of the NRF 1400 can be for use in communicating with other nodes, such as other virtual nodes. For example, the communications interface 1402 of the NRF 1400 can be configured to transmit to and/or receive from other nodes or network functions requests, resources, information, data, signals, or similar. The processing circuitry 1401 of NRF 1400 may be configured to control the communications interface 1402 of the NRF 1400 to transmit to and/or receive from other nodes or network functions requests, resources, information, data, signals, or similar.

Optionally, the NRF 1400 may comprise a memory 1403. In some embodiments, the memory 1403 of the NRF 1400 can be configured to store program code that can be executed by the processing circuitry 1401 of the NRF 1400 to perform the method described herein in relation to the NRF 1400 or the NRF 410. Alternatively or in addition, the memory 1403 of the NRF 1400, can be configured to store any requests, resources, information, data, signals, or similar that are described herein. The processing circuitry 1401 of the NRF 1400 may be configured to control the memory 1403 of the NRF 1400 to store any requests, resources, information, data, signals, or similar that are described herein.

Embodiments described herein therefore provides a dynamic mechanism to authorize NFs and Applications to a specific set of resources offered by a given service without the need of explicitly including each and every resource. This mechanism may be required in 5GC SBA architecture to satisfy the existing requirements in the 3GPP core network, e.g. 3GPP TS 29.328, section 6.2 and 3GPP TS 23.502, section 5.2.3.3.2.

Embodiments described herein also allows NFs to dynamically discover among a plurality of target NFs which resources are allowed to be accessed and which type of operation is allowed (for example, read, write, or both).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a producer network function to register one or more services that the producer network function is capable of providing, the method comprising:
   transmitting a registration request to a network repository function (NRF), wherein the registration request includes registration information comprising:
   an indication of the one or more services; and
   an indication of the following that are allowed per network function consumer type: resources of the one or more services, and operations associated with each allowed resource of the one or more services.

2. The method of claim 1, wherein the indication of the allowed resources and the allowed operations associated with each allowed resources is per network function consumer type and subtype.

3. The method of claim 1, further comprising:
   receiving, from a consumer network function, a service request that includes an access token; and
   checking that the access token was generated by the NRF.

4. The method of claim 3, further comprising, responsive to the access token being generated by the NRF, checking that a target network function type in the access token is a type of the producer network function.

5. The method of claim 3, wherein:
   the access token further comprises an indication of the following for which the consumer network function is authorized: resources of the one or more services, and operations associated with each authorized resource of the one or more services;
   the service request indicates a requested operation over a resource; and
   the method further comprises executing the requested operation responsive to the requested operation falling within the authorized resources and authorized operations associated with each authorized resource of the one or more services.

6. A producer network function configured to register one or more services that the producer network function is capable of providing, wherein the producer network function comprises processing circuitry configured to perform the method of claim 1.

7. The producer network function of claim 6, wherein the indication of the allowed resources and the allowed operations associated with each allowed resources is of per network function consumer type and subtype.

8. The producer network function of claim 6, wherein the processing circuitry is further configured to:
   receive, from a consumer network function, a service request that includes an access token; and
   check that the access token was generated by the NRF.

9. The producer network function of claim 8, wherein the processing circuitry is further configured to, responsive to the access token being generated by the NRF, check that a target network function type in the access token is a type of the producer network function.

10. The producer network function of claim 8, wherein:
    the access token further comprises an indication of the following for which the consumer network function is authorized: resources of the one or more services, and operations associated with each authorized resource of the one or more services;
    the service request indicates a requested operation over a resource; and
    the processing circuitry is further configured to execute the requested operation responsive to the requested operation falling within the authorized resources and authorized operations associated with each authorized resource of the one or more services.

11. A method performed by a consumer network function to request a service from a producer network function, the method comprising:
    transmitting a registration request to a network repository function (NRF), wherein the registration request includes:
    an indication of one or more services that are expected to be consumed by the consumer network function; and
    an indication of the following that are expected to be consumed by the consumer network function: resources of the one or more services, and operations associated with each expected resource of the one or more services; and
    an indication of the consumer network function type.

12. The method of claim 11, further comprising:
    transmitting, to the NRF, an access token request that includes an indication of one or more expected services;
    receiving, from the NRF, an access token that includes:
    an indication of the following for which the consumer network function is authorized: resources of the one or more expected services, and operations associated with each authorized resource of the one or more expected services, and an indication of a target network function type; and transmitting, to a producer network function, a service request that includes the access token and a requested operation over a requested resource.

13. The method of claim 12, further comprising:

responsive to receiving the access token, transmitting, to the NRF, a discovery request comprising:
- an indication of the target network function type, and
- an indication of the following for which the consumer network function is authorized: resources of the one or more expected services, and operations associated with each authorized resource of the one or more expected services.

14. The method of claim 13, further comprising:

receiving, from the NRF, a discovery response indicating one or more producer network functions of the target network function type capable of providing the authorized resources of the one or more expected services and authorized operations associated with each authorized resource of the one or more expected services; and selecting a producer network function from the one or more producer network functions indicated by the discovery response.

15. The method of claim 12, wherein the access token request also includes an indication of a consumer network function type and an indication of the following: requested resources of the one or more expected services, and requested operations associated with each requested resource of the one or more expected services.

16. A consumer network function configured to request a service from a producer network function, wherein the consumer network function comprises processing circuitry configured to perform the method of claim 11.

17. The consumer network function of claim 16, wherein the processing circuitry is further configured to:
- transmit, to the NRF, an access token request that includes an indication of one or more expected services;
- receive, from the NRF, an access token that includes:
  - an indication of the following for which the consumer network function is authorized: resources of the one or more expected services, and operations associated with each authorized resource of the one or more expected services, and
  - an indication of a target network function type; and
- transmit, to a producer network function, a service request that includes the access token and a requested operation over a requested resource.

18. The consumer network function of claim 17, wherein the processing circuitry is further configured to, responsive to receiving the access token, transmit to the NRF a discovery request comprising:
- an indication of the target network function type, and
- an indication of the following for which the consumer network function is authorized: resources of the one or more expected services, and operations associated with each authorized resource of the one or more expected services.

19. The consumer network function of claim 18, wherein the processing circuitry is further configured to:
- receive, from the NRF, a discovery response indicating one or more producer network functions of the target network function type capable of providing the authorized resources of the one or more expected services and authorized operations associated with each authorized resource of the one or more expected services; and
- select a producer network function from the one or more producer network functions of the discovery response.

20. The consumer network function of claim 16, wherein the access token request also includes an indication of a consumer network function type and an indication of the following: requested resources of the one or more expected services, and requested operations associated with each requested resource of the one or more expected services.

21. A method performed by a network repository function for authorizing a consumer network function to access services at a producer network function, the method comprising:

receiving a first registration request from a producer network function, wherein the first registration request includes first registration information comprising:
- an indication of one or more services; and
- an indication of the following that are allowed per network function consumer type: resources of the one or more services, and operations associated with each allowed resource of the one or more services; and storing the first registration information in association with an identity of the producer network function;

receiving a second registration request from a consumer network function, wherein the second registration request includes second registration information comprising:
- an indication of one or more services that are expected to be consumed; and
- an indication of the following that are expected to be consumed by the consumer network function: resources of the one or more services, and operations associated with each expected resource of the one or more services; and
- an indication of the consumer network function type; and storing the second registration information in association with an identity of the consumer network function.

22. The method of claim 21, wherein:
- the indication of resources and operations associated with each resource of the one or more services that are allowed is registered from the producer network function per network function consumer type and subtype; and
- the indication of the consumer network function type registered from the consumer network function comprises an indication of a consumer network function subtype.

23. The method of claim 21, further comprising:

receiving, from a consumer network function, an access token request that includes an indication of one or more expected services;

based on the requesting consumer network function type and on the stored first registration information, determining the following for which the consumer network function is authorized: resources of the one or more expected services, and operations associated with each authorized resource of the one or more expected services; and transmitting, to the consumer network function, an access token that includes an indication of the authorized resources of the one or more expected services and the authorized operations associated with each authorized resource of the one or more expected services.

24. The method of claim 23, wherein the access token request also includes an indication of the following: requested resources of the one or more expected services, and requested operations associated with each requested resource of the one or more expected services.

25. The method of claim 23, wherein the authorized resources of the one or more expected services and the authorized operations associated with each authorized resource of the one or more expected services are determined based on the following:
   stored registered information associated with one or more producer network functions,
   the stored second registration information and a consumer network function subtype, and the access token request.

26. A network repository function (NRF) configured to authorize a consumer network function to access services at a producer network function, the NRF comprising processing circuitry configured to perform the method of claim 21.

27. The NRF of claim 26, wherein:
   the indication of resources and operations associated with each resource of the one or more services that are allowed is registered from the producer network function per network function consumer type and subtype; and
   the indication of the consumer network function type registered from the consumer network function comprises an indication of a consumer network function subtype.

28. The NRF of claim 26, wherein the processing circuitry is further configured to:
   receive, from a consumer network function, an access token request that includes an indication of one or more expected services;
   based on the requesting consumer network function type and on the stored first registration information, determine the following for which the consumer network function is authorized: resources of the one or more expected services, and operations associated with each authorized resource of the one or more expected services; and
   transmit, to the consumer network function, an access token that includes an indication of the authorized resources of the one or more expected services and the authorized operations associated with each authorized resource of the one or more expected services.

29. The NRF of claim 28, wherein the access token request also includes an indication of the following: requested resources of the one or more expected services, and requested operations associated with each requested resource of the one or more expected services.

30. The NRF of claim 28, wherein the processing circuitry is further configured to determine the authorized resources of the one or more expected services and the authorized operations associated with each authorized resource of the one or more expected services based on the following:
   stored registered information associated with one or more producer network functions,
   the stored second registration information and a consumer network function subtype, and
   the access token request.

31. A method performed by a consumer network function for requesting a service from a producer network function; the method comprising:
   transmitting, to a network repository function (NRF), an access token request that includes an indication of one or more expected services;
   receiving, from the NRF, an access token that includes an indication of the following for which the consumer network function is authorized: resources of the one or more services, and operations associated with each authorized resource of the one or more services; and
   transmitting, to a producer network function, a service request that includes the access token and a requested operation over a requested resource.

32. A consumer network function configured to request a service from a producer network function, wherein the consumer network function comprises processing circuitry configured to perform the method of claim 31.

33. A method performed by a network repository function (NRF) for authorizing a consumer network function to access services at a producer network function, the method comprising:
   receiving a registration request from a producer network function, wherein the registration request includes registration information comprising:
      an indication of one or more services; and
      an indication of the following that are allowed per network function consumer type: resources of the one or more services, and operations associated with each allowed resource of the one or more services; and
   storing the registration information in association with an identity of the producer network function.

34. A network repository function (NRF) configured to authorize a consumer network function to access services at a producer network function, the NRF comprising processing circuitry configured to perform the method of claim 33.

* * * * *